United States Patent
Haataja et al.

(10) Patent No.: US 6,597,854 B2
(45) Date of Patent: *Jul. 22, 2003

(54) OPTICAL CABLE EXIT TROUGH

(75) Inventors: Timothy Jon Haataja, Prior Lake, MN (US); Thomas Walter Kampf, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/745,299

(22) Filed: Dec. 20, 2000

(65) Prior Publication Data

US 2002/0154880 A1 Oct. 24, 2002

Related U.S. Application Data

(60) Continuation of application No. 09/354,594, filed on Jul. 16, 1999, now Pat. No. 6,192,181, which is a division of application No. 08/971,421, filed on Nov. 17, 1997, now Pat. No. 5,937,131.

(51) Int. Cl.[7] .............................. G02B 6/00; G02B 6/50
(52) U.S. Cl. ........................ 385/136; 385/134; 385/135; 385/137
(58) Field of Search .................... 385/136, 134, 385/135, 137, 147

(56) References Cited

U.S. PATENT DOCUMENTS

| | | | |
|---|---|---|---|
| 3,001,001 A | 9/1961 | Bibb ........................ 174/71 R |
| 4,163,572 A | 8/1979 | Benscoter |
| 4,366,341 A | 12/1982 | van Riet |
| 4,860,168 A | 8/1989 | Wiljanen et al. |
| 4,926,009 A | 5/1990 | Van Leeuwen |
| 5,067,678 A | 11/1991 | Henneberger et al. |
| 5,142,606 A | 8/1992 | Carney et al. |
| 5,316,243 A | 5/1994 | Henneberger |
| 5,316,244 A | 5/1994 | Zetena, Jr. |
| 5,399,814 A | 3/1995 | Staber et al. |
| 5,402,515 A | 3/1995 | Vidacovich et al. |
| 5,530,787 A | 6/1996 | Arnett |
| 5,872,336 A | 2/1999 | Long |
| 5,937,131 A | * 8/1999 | Haataja et al. ............... 385/136 |
| 6,192,181 B1 | 2/2001 | Haataja et al. |

FOREIGN PATENT DOCUMENTS

| | | |
|---|---|---|
| DE | 37 42 448 A1 | 6/1989 |
| FR | 1207610 | 6/1958 |
| FR | 2488064 | 7/1980 |
| GB | 2137025 A | 2/1984 |

OTHER PUBLICATIONS

Exhibit E, AT&T Network Systems literature entitled, "Facility Network Management System," 3 pages, the third page of which is dated Mar. 27, 1991.

Exhibit F, AT&T advertisement literature entitled, "Facility Network Management System" believed to correspond to system shown in Exhibit E, p. 3 of which is dated Mar. 27, 1991.

(List continued on next page.)

*Primary Examiner*—Phan T. H. Palmer
(74) *Attorney, Agent, or Firm*—Merchant & Gould P.C.

(57) ABSTRACT

A cable exit trough is mountable to a lateral trough section either during initial assembly of the cable routing system, or at a later date. The exit trough includes a bracket portion mountable to the top edge of one of the sides of the lateral trough section. Two lead-ins are provided to lead the cable in an upward direction from the lateral trough section to the exit trough. The exit trough includes an exit trough portion extending from the bracket portion upwardly away from the lateral trough section. The exit trough portion includes a convexly curved bottom trough surface, and two convexly curved upstanding sides. The exit trough portion and the lead-ins define a cable pathway from the lateral trough section to an exit point of the exit trough portion which can either lead downwardly relative to the lateral trough section, or horizontally.

67 Claims, 16 Drawing Sheets

OTHER PUBLICATIONS

Exhibit G, "Memorandum Opinion and Order" filed Apr. 24, 2002 by United States District Court Judge Ann Montgomery in the action titled ADC Telecommunications, Inc. v. Panduit Corp., Civil No. 01–477 ADM/AJB, pp. 1–24.

Exhibit H, "Defendant's Prior Art List" dated Oct. 1, 2001 in the action titled ADC Telecommunications, Inc. v. Panduit Corp., Civil Action No. 01–CV–477 ADM/AJB. pp. 1–29.

Exhibit I, "Report No.,: 02.3–02" by Eric Pearson of Pearson Technologies Incorporated, served Apr. 22, 2002 in the action titled ADC Telecommunications, Inc. v. Panduit Corp., Civil Action No. 01–CV–477 ADM/AJB. pp. 1–37 and Exhibits 1 and 2.

Exhibit J, "Defendant's Responses to Plaintiff's First Set of Interrogatories" dated Dec. 14, 2001 in the action titled ADC Telecommunications, Inc. v. Fiber Management Solutions, Inc., Case No. CV 01 3974 ADS, pp. 1–12.

ADC Telecommunications brochure entitled "FiberGuide® Fiber Management Systems," 33 pages, dated Oct., 1995.

Warren & Brown & Staff brochure pages entitled "lightpaths," Issue 2, 11 pages, dated 1995.

Warren & Brown & Staff Pty Ltd brochure pages entitled "Optical Fibre Ductwork," 2 pages, undated.

ADC Telecommunications brochure entitled "Fiber Guide™ Fiber Management System," 6 pages, dated Jun., 1989.

* cited by examiner

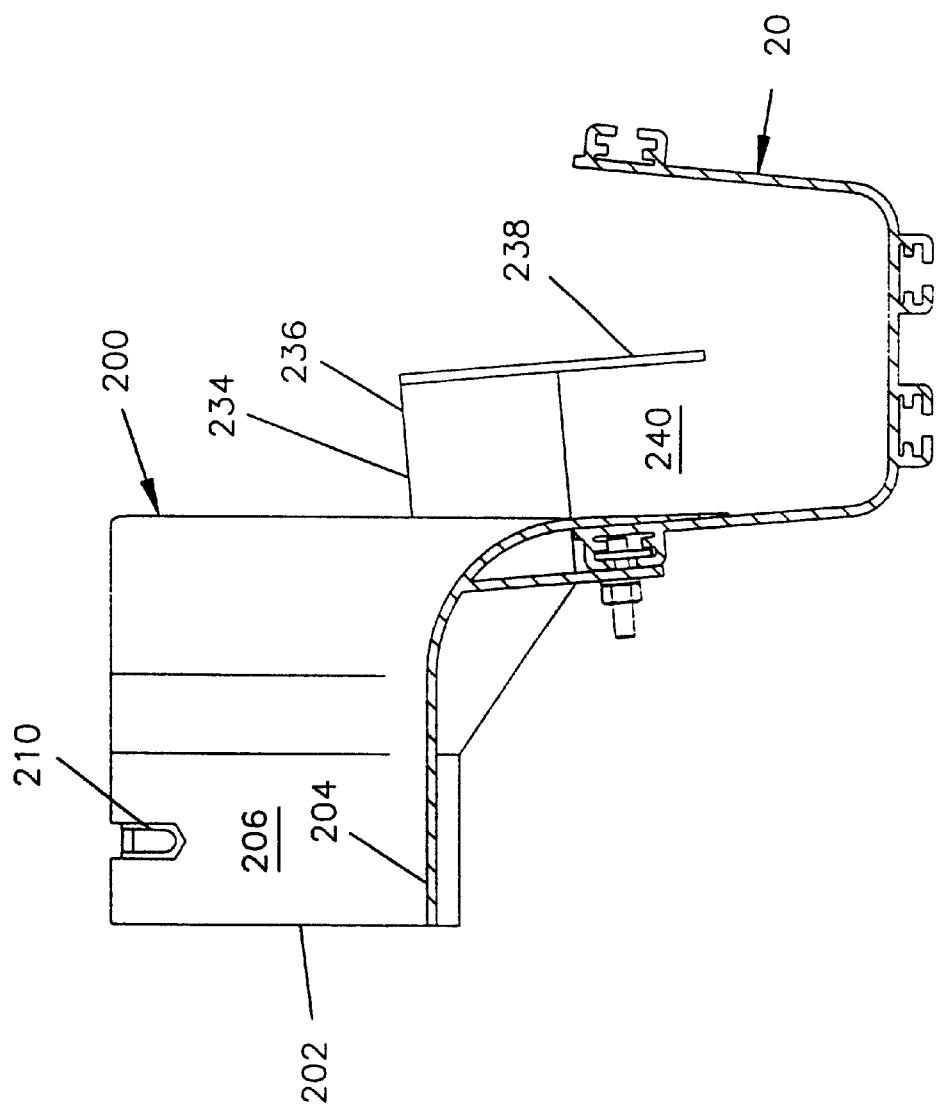

OPTICAL CABLE EXIT TROUGH

This application is a continuation Ser. No. 09/354,594, now U.S. Pat. No. 6,192,181 filed Jul. 16, 1999, which is a division of application Ser. No. 08/971,421, U.S. Pat. No. 5,937,131 filed Nov. 17, 1997, which application(s) are incorporated herein by reference.

FIELD OF THE INVENTION

The invention pertains to a system for the management and routing of optical fiber cables.

BACKGROUND OF THE INVENTION

In the telecommunications industry, the use of optical fibers for signal transmissions is accelerating. With the increased utilization of optical fiber systems, optical fiber cable management requires industry attention.

One area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly, a routing system is not practical which would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not be bent beyond a minimum radius of curvature. For example, it is commonly recognized that optical fibers should not be bent in a radius of less than 1.5 inches.

SUMMARY OF THE INVENTION

According to preferred embodiments of the present invention, a cable routing system is disclosed for routing optical fiber cables between optical transmission equipment. The system includes a lateral trough section configured for defining a cable pathway. An exit trough is mountable to the lateral trough section to provide a cable exit pathway from the lateral trough section. The exit trough includes a bracket portion mountable to a top edge of the lateral trough section. Two curved lead-ins on opposite ends of the bracket portion each define a cable pathway leading to an exit trough portion extending from a middle of the bracket portion in a direction away from the lateral trough section. The exit trough portion includes a convexly curved bottom trough surface, and two convexly curved upstanding sides on opposite sides of the bottom trough surface. The exit trough defines a cable pathway leading upwardly and away from the lateral trough section. The exit trough is mountable to the lateral trough section without modification to the lateral trough section. The exit trough can be placed generally at any location along the lateral trough section, and can be placed during initial system setup, or at a later time as the need arises for an exit pathway from the lateral trough section, such as when new optical transmission equipment is added to the system. At least one fastener secures the bracket portion to the lateral trough section. The exit trough may include a downspout portion defining a downwardly directed cable pathway, or a horizontal portion defining a horizontally directed cable pathway, or other directional pathway as desired.

BRIEF DESCRIPTION OF THE DRAWINGS

FIG. 16 is a left cross-sectional side view through, the center of the lateral trough section and through the exit trough.

DETAILED DESCRIPTION OF THE PREFERRED EMBODIMENTS

Figure 1:
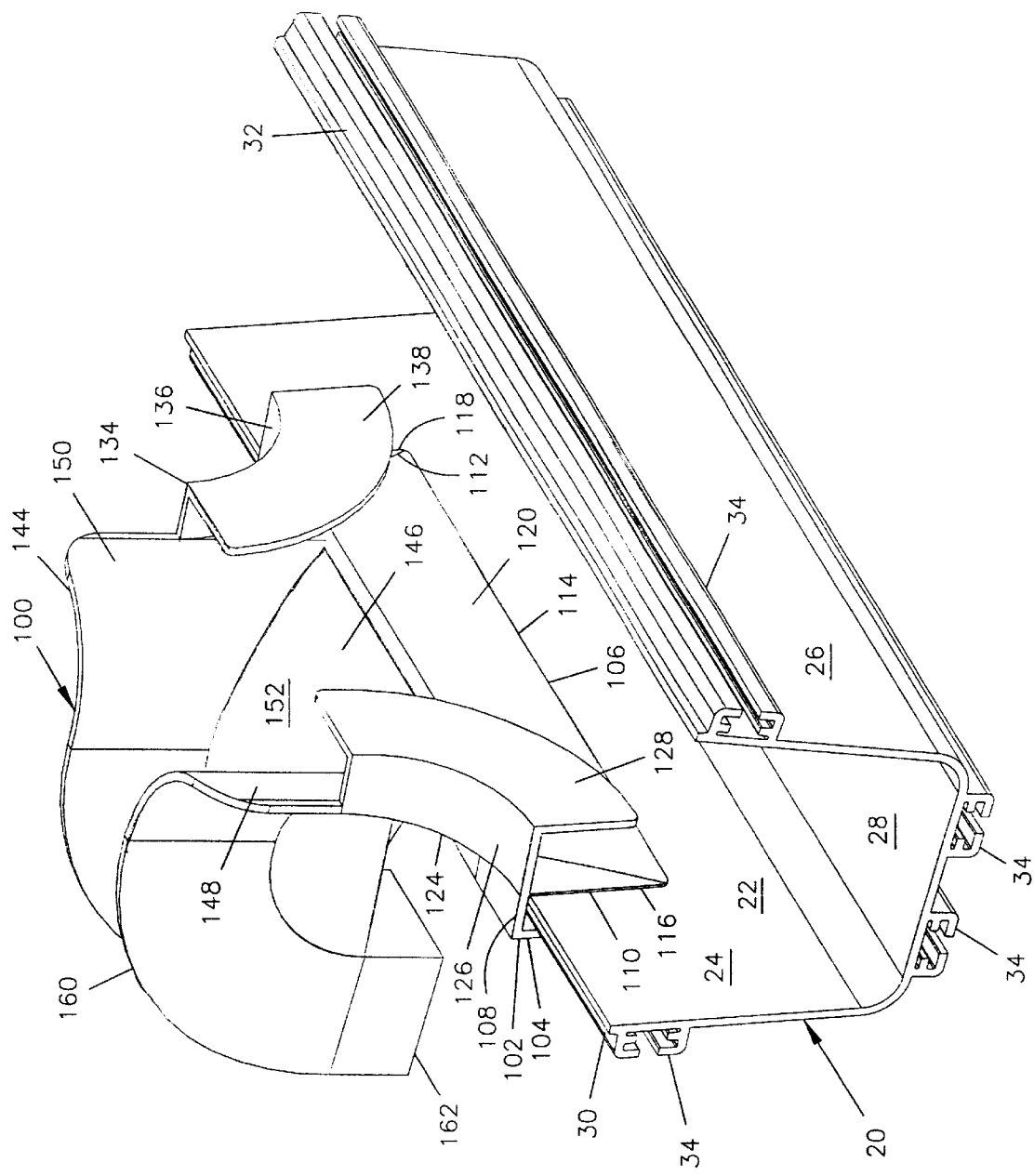
FIG. 1 is a top, front, and left side perspective view of a lateral trough section and an exit trough mounted thereto according to one preferred embodiment of the present invention.

Referring now to FIGS. 1–8, a first embodiment of an exit trough 100 is shown mounted to a lateral trough section 20. Lateral trough section 20 defines a cable pathway 22 for routing optical fiber cables between locations. Lateral trough section 20 and exit trough 100 can be part of a cable routing system typically within a structure, such as a building having optical fiber signal transmitting equipment. Lateral trough section 20 typically is suspended from a ceiling structure by any suitable means (not shown). U.S. Pat. Nos. 5,067,678 and 5,316,243 disclose various cable routing systems, including lateral trough sections like lateral trough section 20 illustrated in FIGS. 1–8. Exit trough 100 is not only usable with lateral trough section 20 shown in FIGS. 1–8, but also with other cable routing systems disclosed in U.S. Pat. Nos. 5,067,678 and 5,316,243, the disclosures of which are hereby incorporated by reference, and other cable routing systems.

Generally, lateral trough section 20 includes first and second upstanding sides 24, 26, and a bottom 28 extending therebetween and defining cable pathway 22. Side 24 includes a top edge 30. Opposite side 26 also includes similar top edge 32. Lateral trough section 20 includes a plurality of attachment members 34 on an outside portion for use in attaching lateral trough sections 20 together end to end, or adding other system hardware.

As will be described below, exit trough 100 mounts to lateral trough section 20 adjacent to top edge 30 of side 24 through attachment member 34. Exit trough 100 creates a cable exit pathway from lateral trough section 20.

Figure 2:
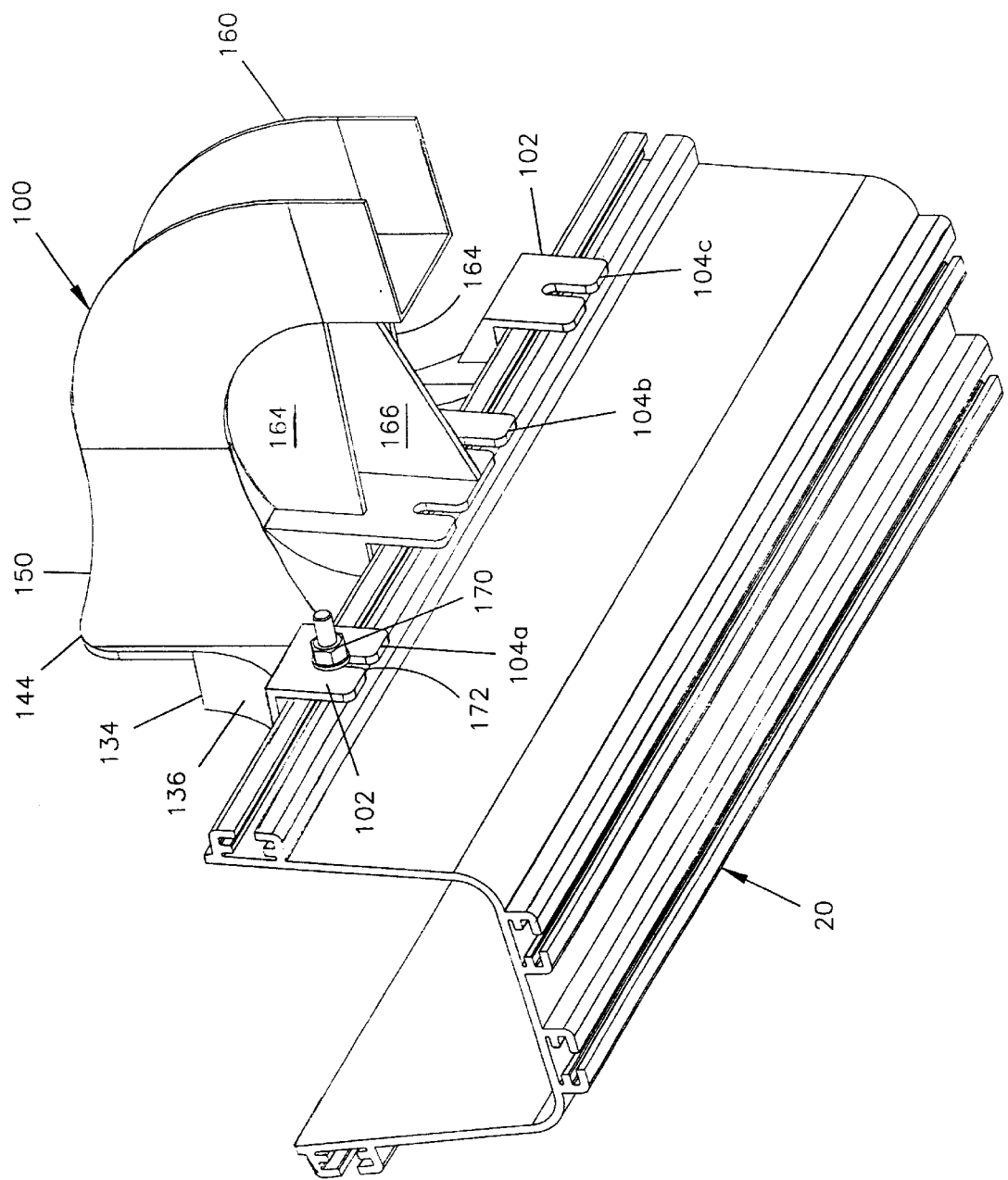
FIG. 2 is a bottom, back, and right side perspective view of the first embodiment.
Figure 3:
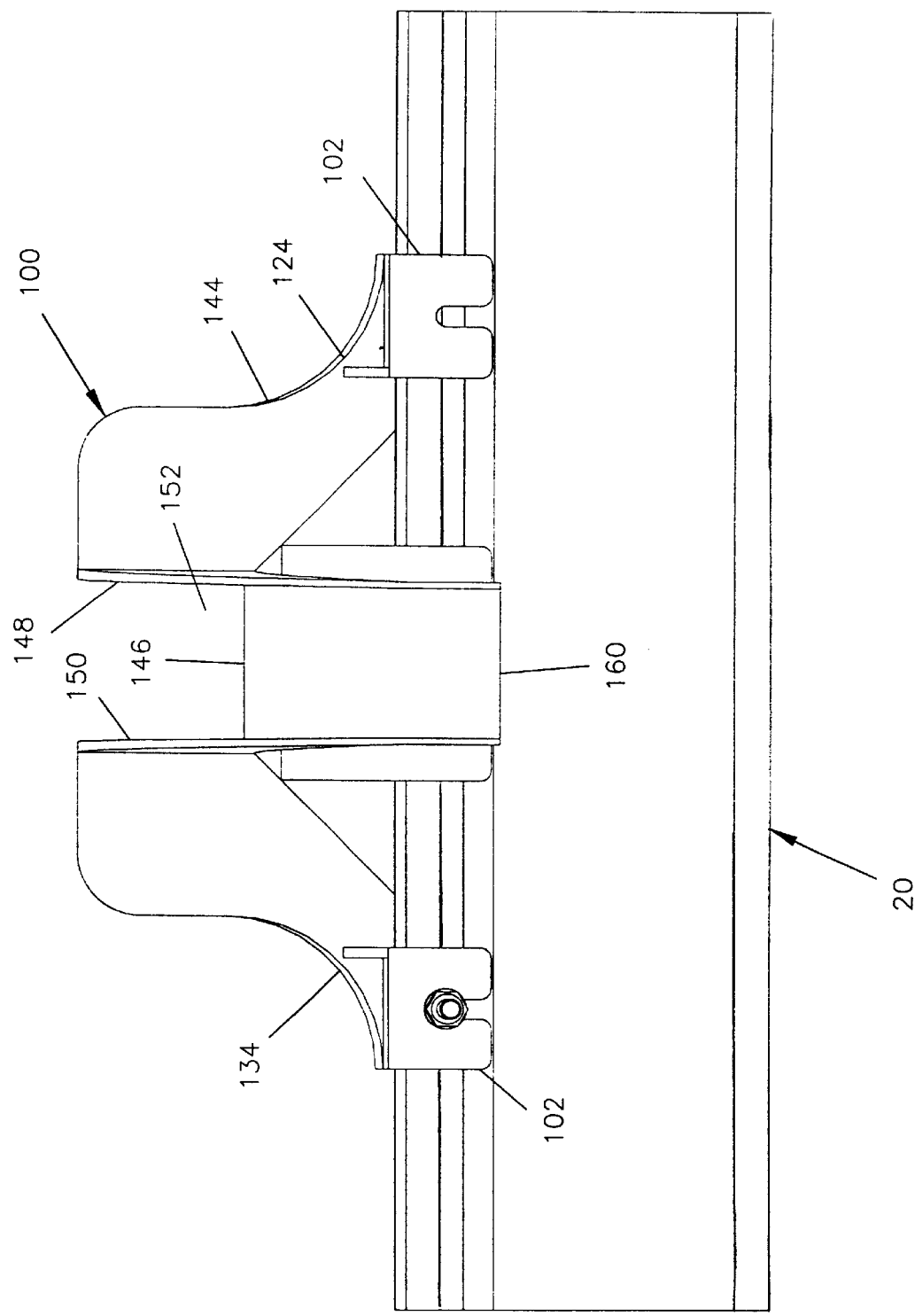
FIG. 3 is a back view of the first embodiment.
Figure 4:
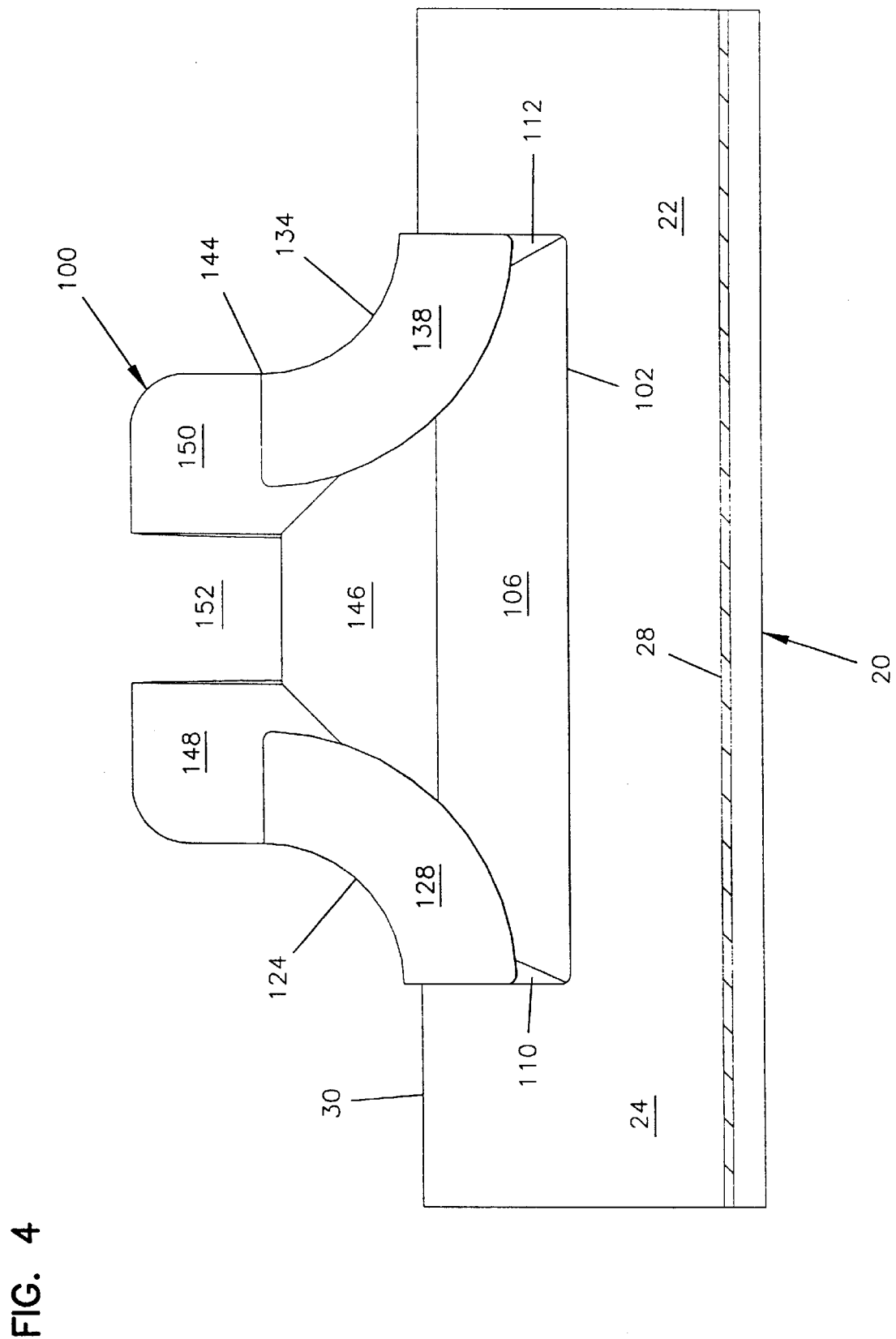
FIG. 4 is a front view of the first embodiment, and showing the lateral trough section in cross-section through a middle of the lateral trough section.
Figure 5:
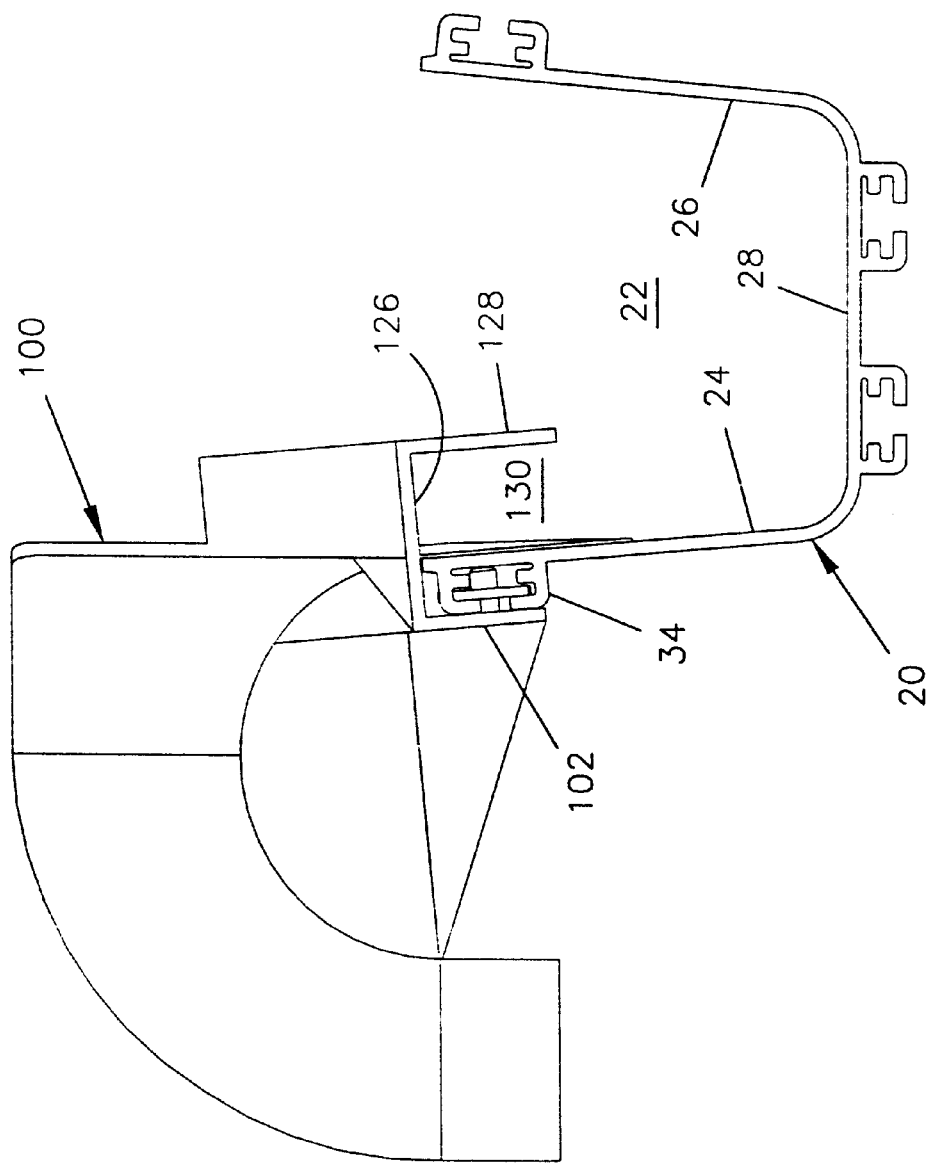
FIG. 5 is a left side view of the first embodiment.
Figure 6:
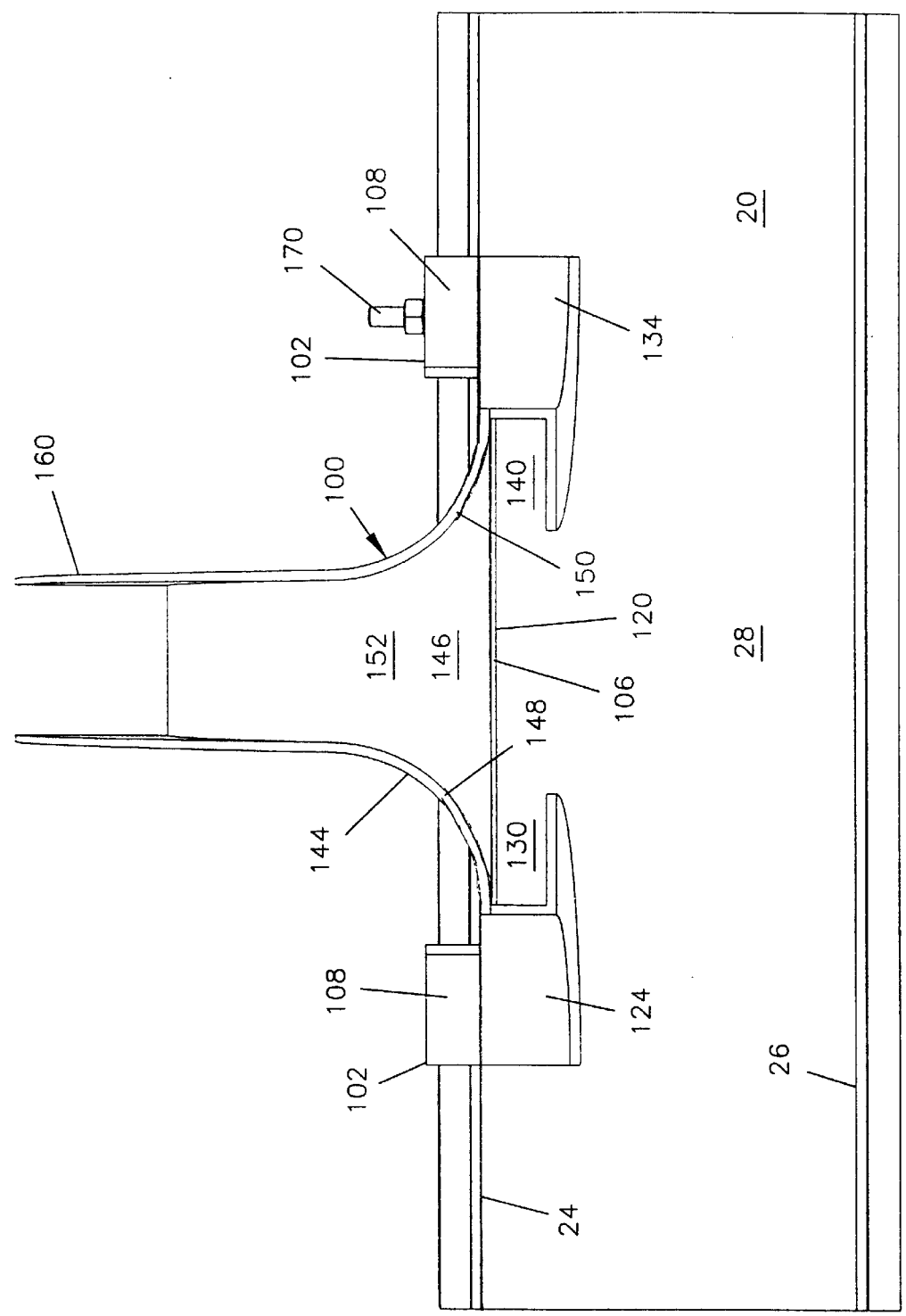
FIG. 6 is a top view of the first embodiment.
Figure 7:
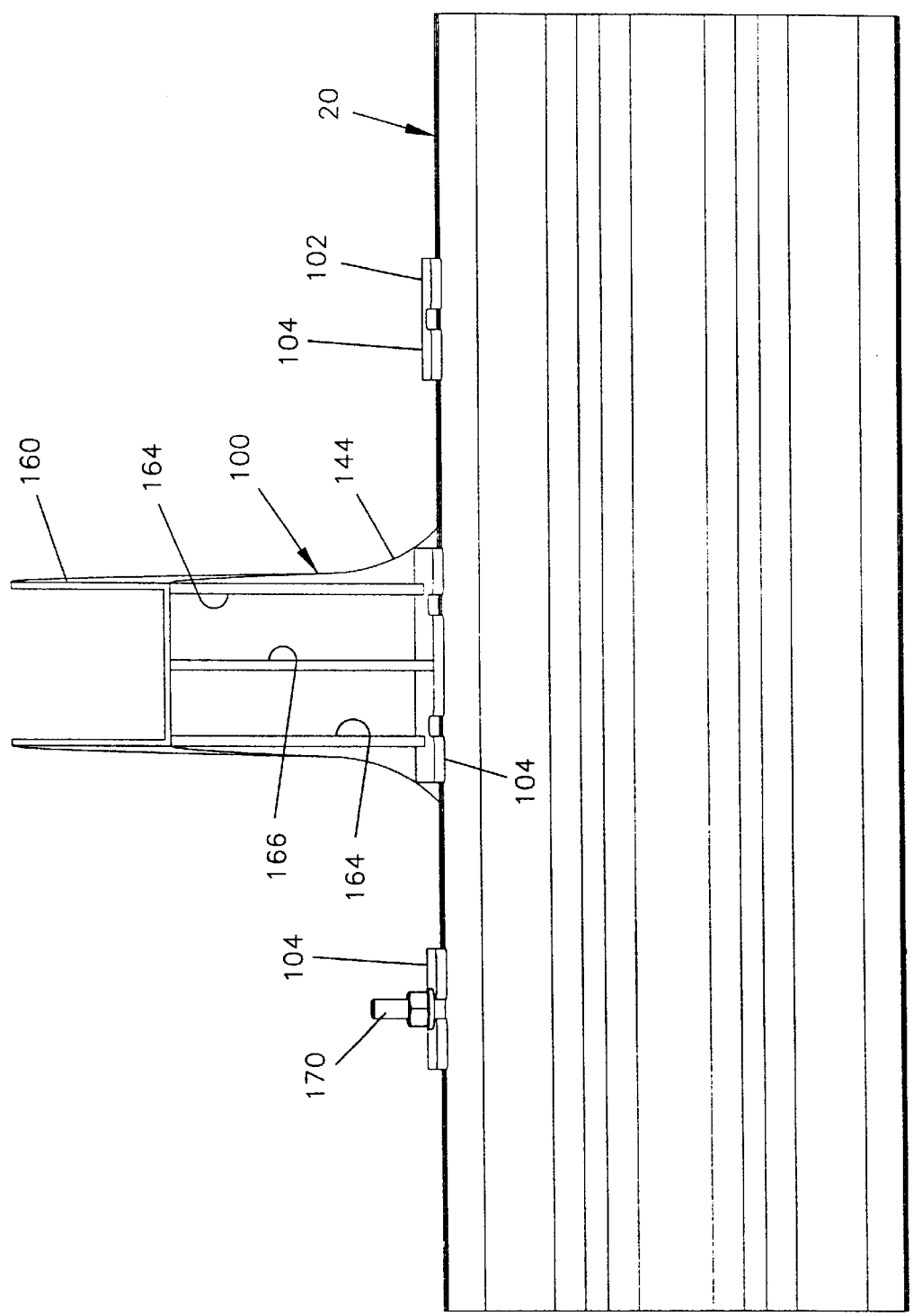
FIG. 7 is a bottom view of the first embodiment.
Figure 8:
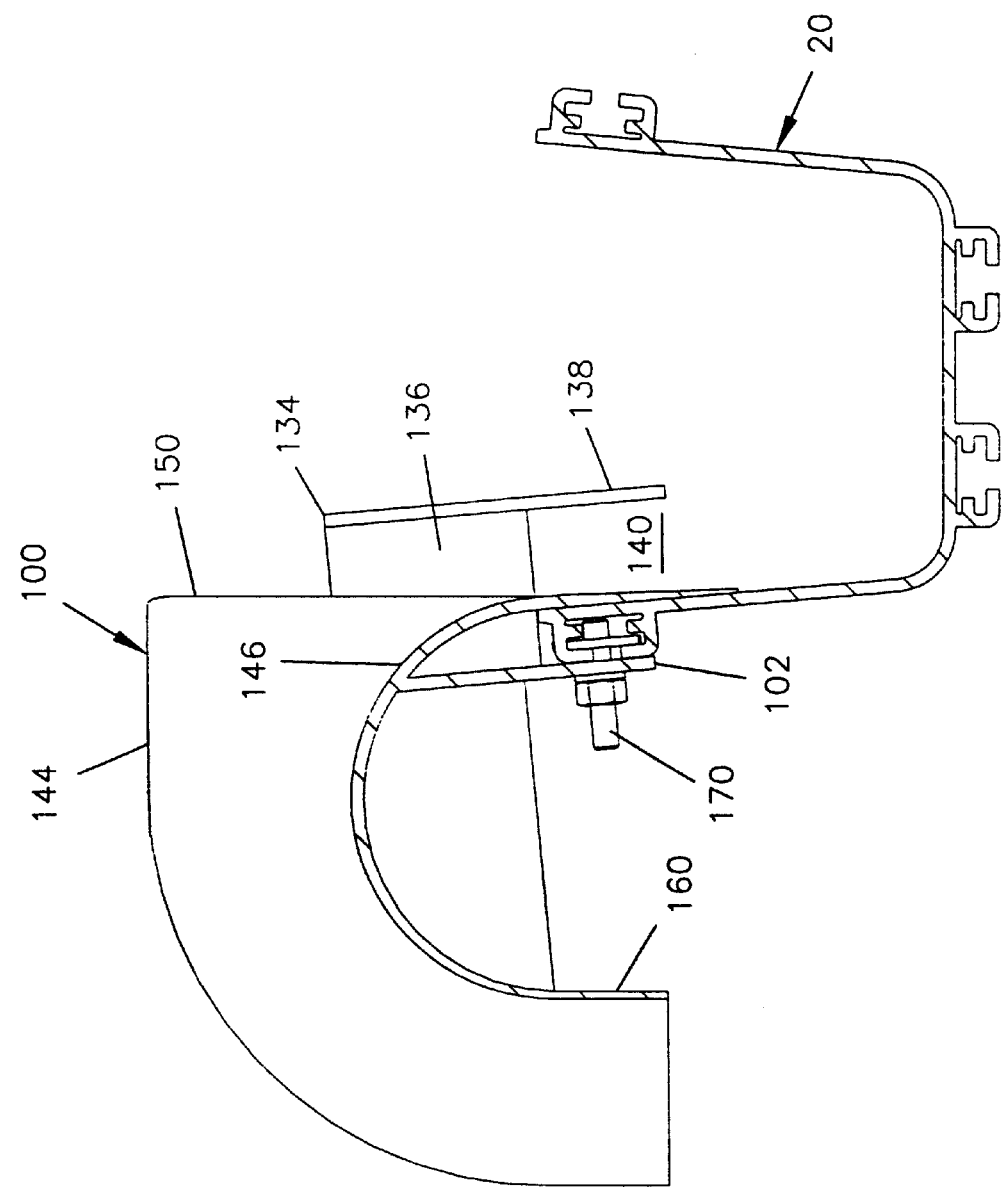
FIG. 8 is a left cross-sectional side view through the center of the lateral trough section and through the exit trough.
Figure 9:
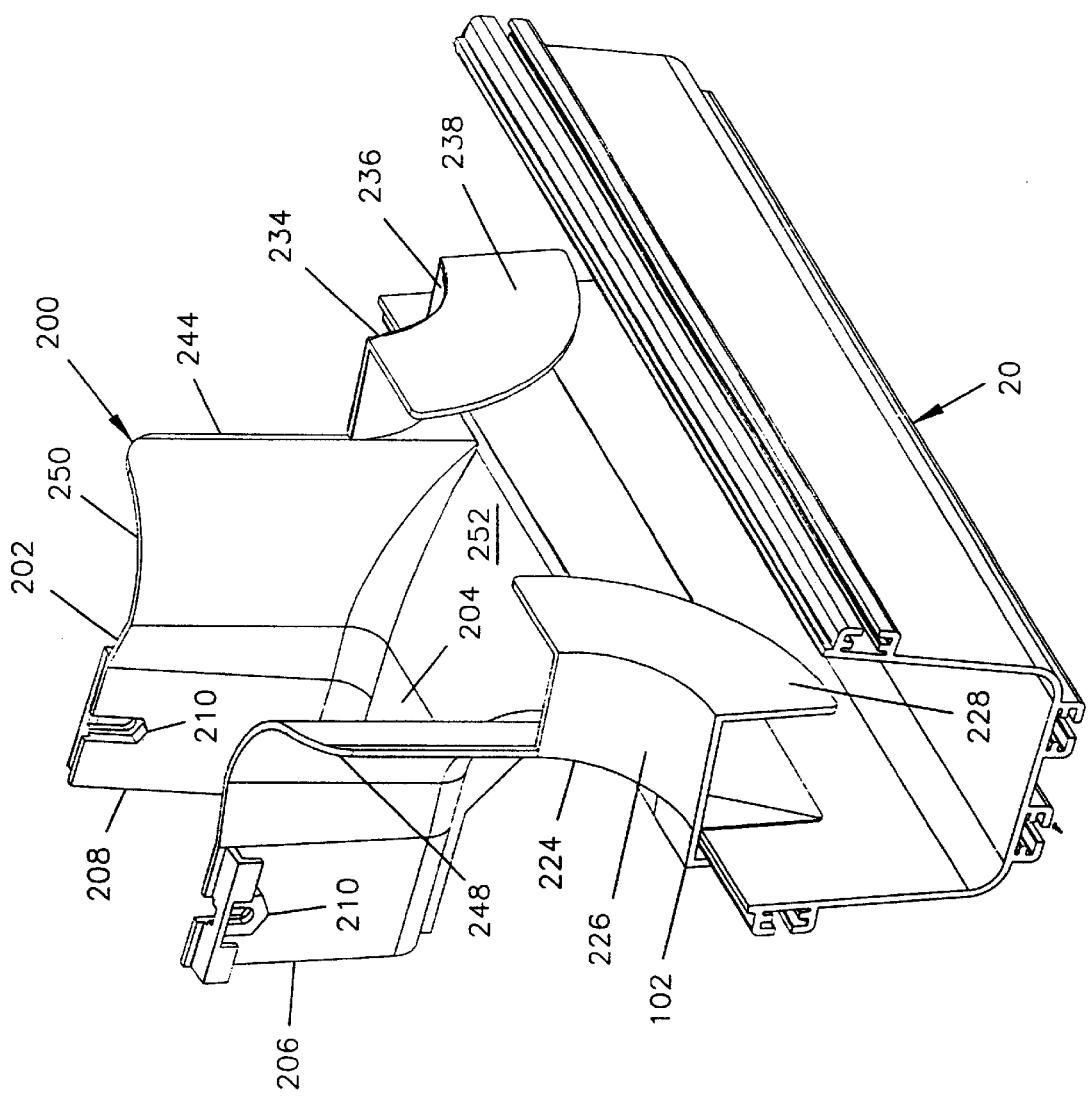
FIG. 9 is a top, front, and left side perspective view of a lateral trough section and an exit trough mounted thereto according to the second preferred embodiment of the present invention.
Figure 10:
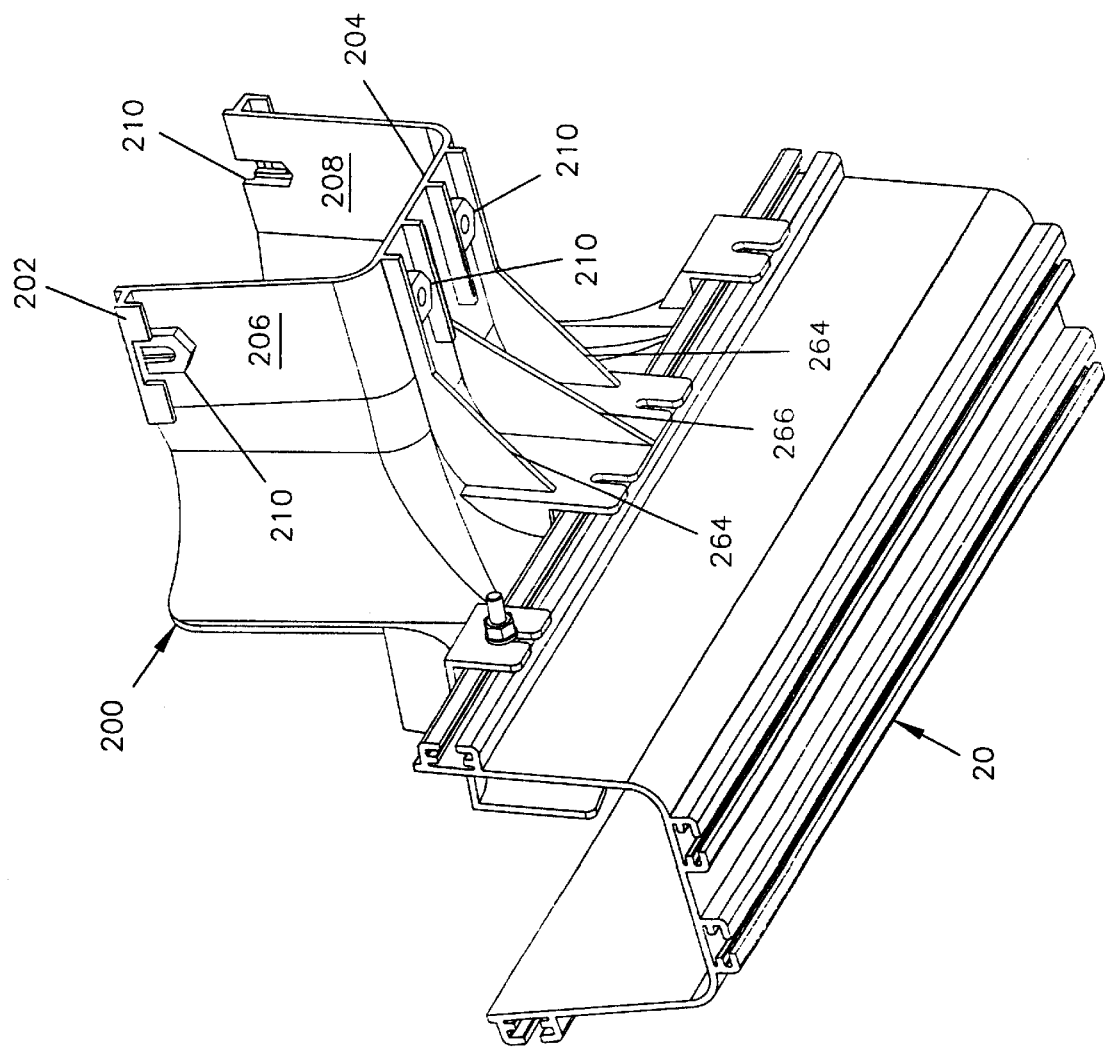
FIG. 10 is a bottom, back, and right side perspective view of the second embodiment.
Figure 11:
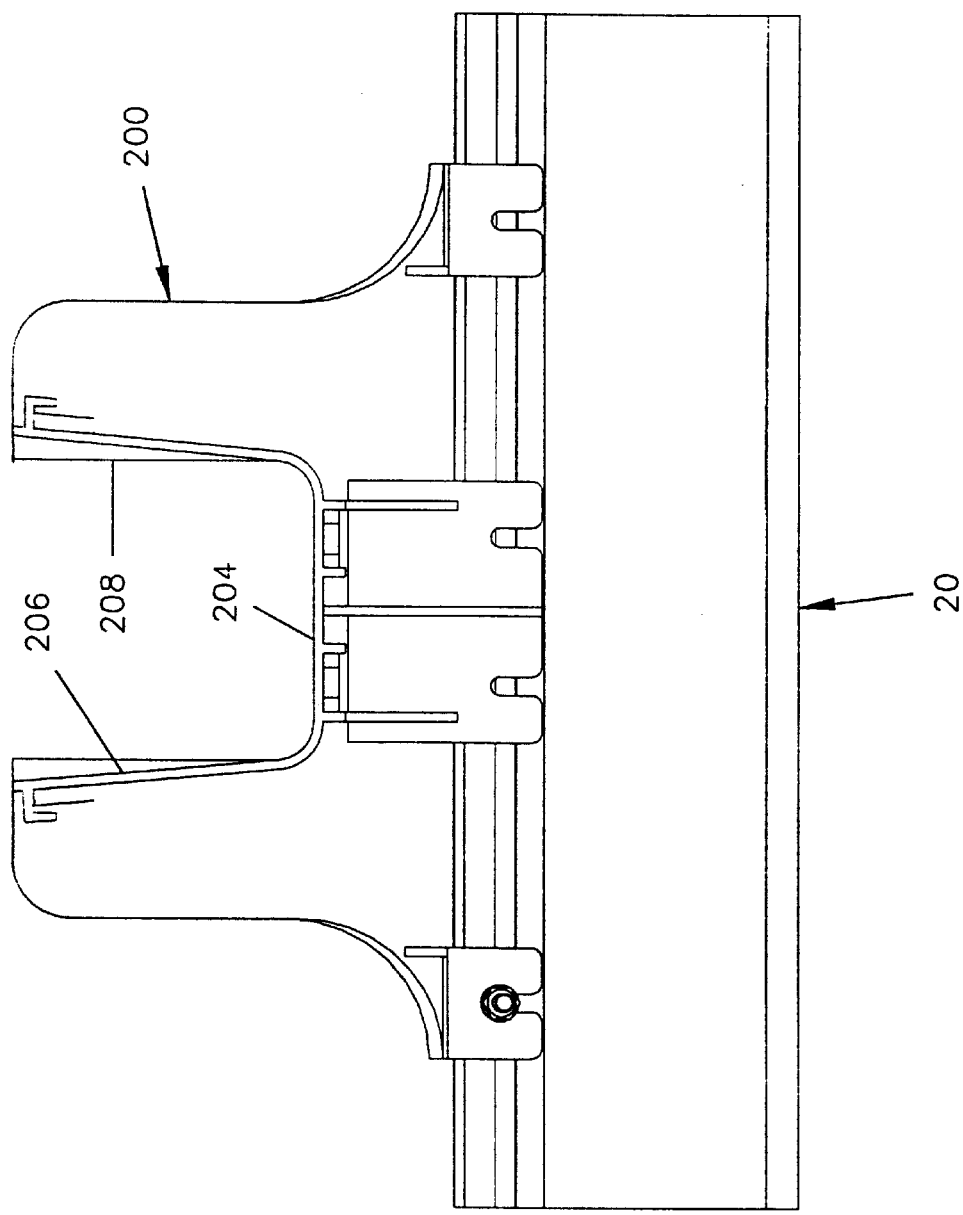
FIG. 11 is a back view of the second embodiment.
Figure 12:
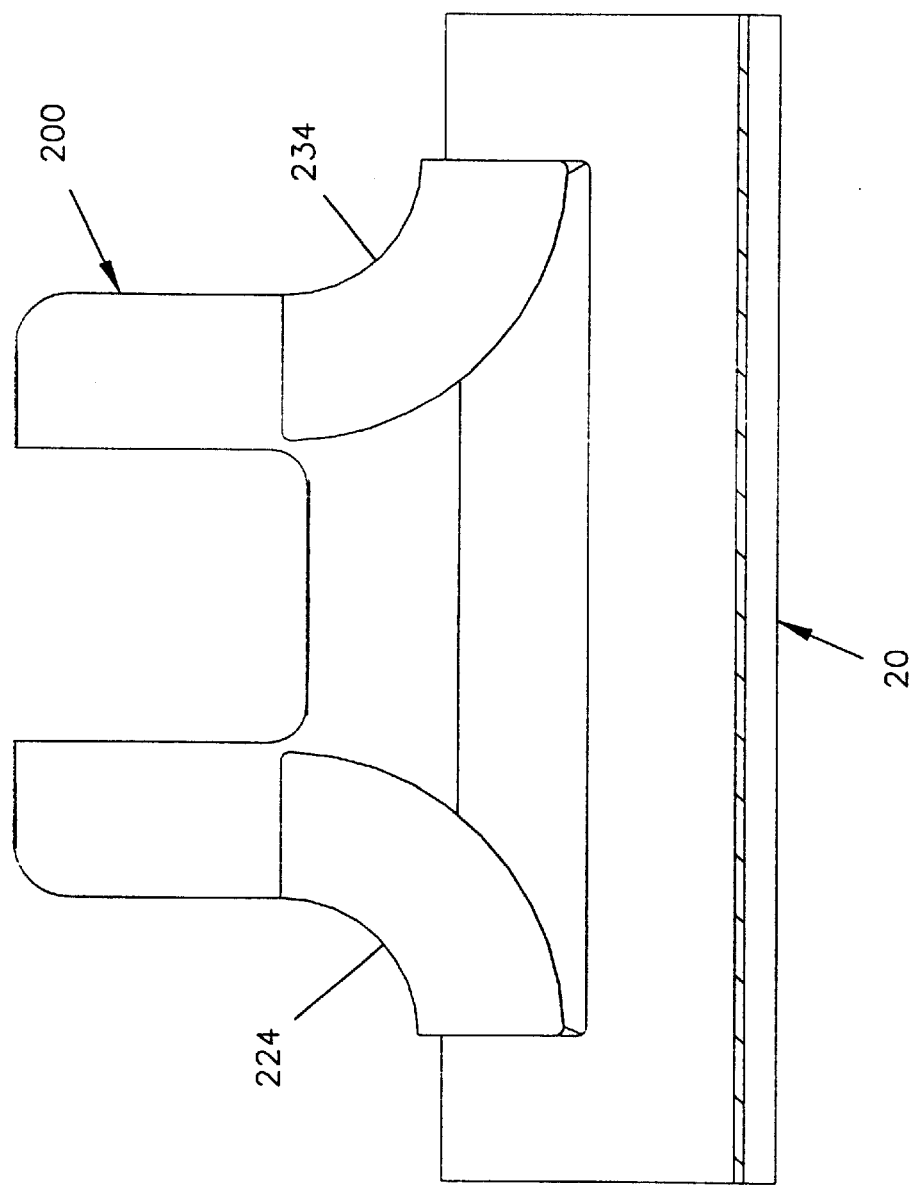
FIG. 12 is a front view of the second embodiment, and showing the lateral trough section in cross-section through a middle of the lateral trough section.
Figure 13:
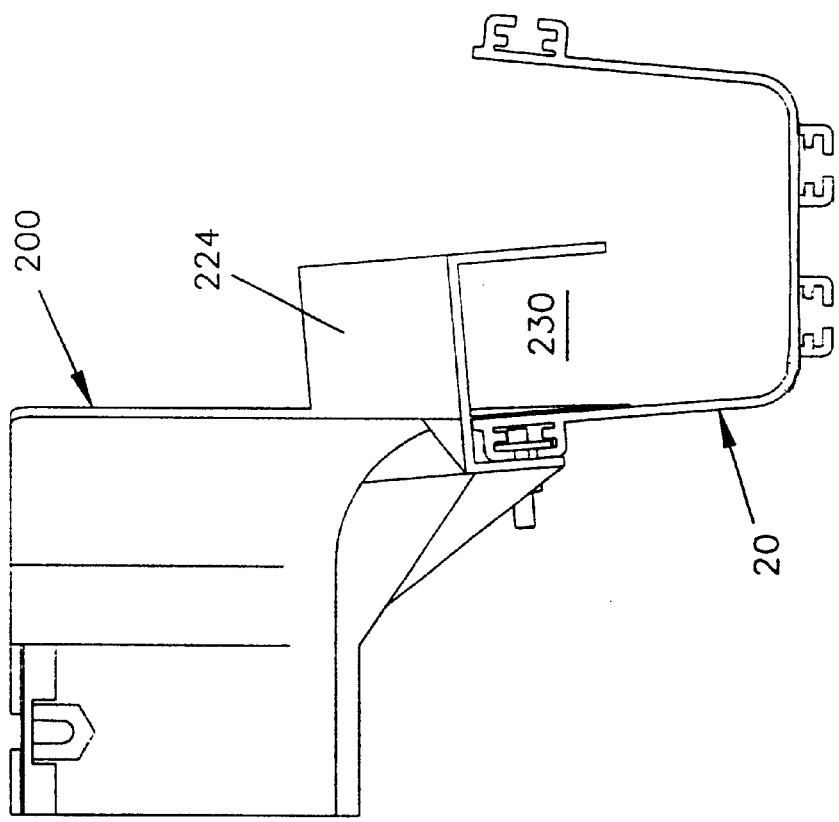
FIG. 13 is a left side view of the second embodiment.
Figure 14:
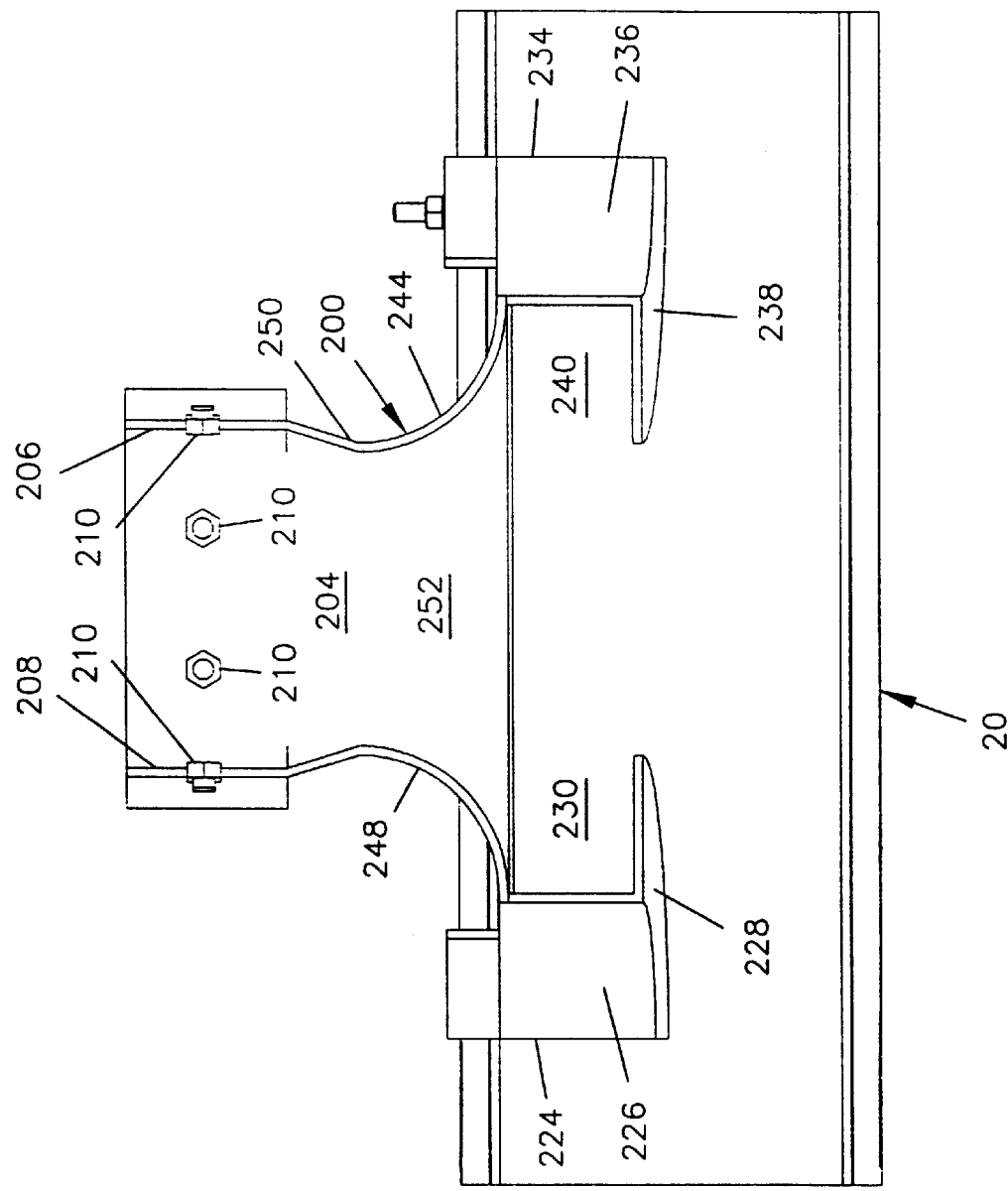
FIG. 14 is a top view of the second embodiment.
Figure 15:
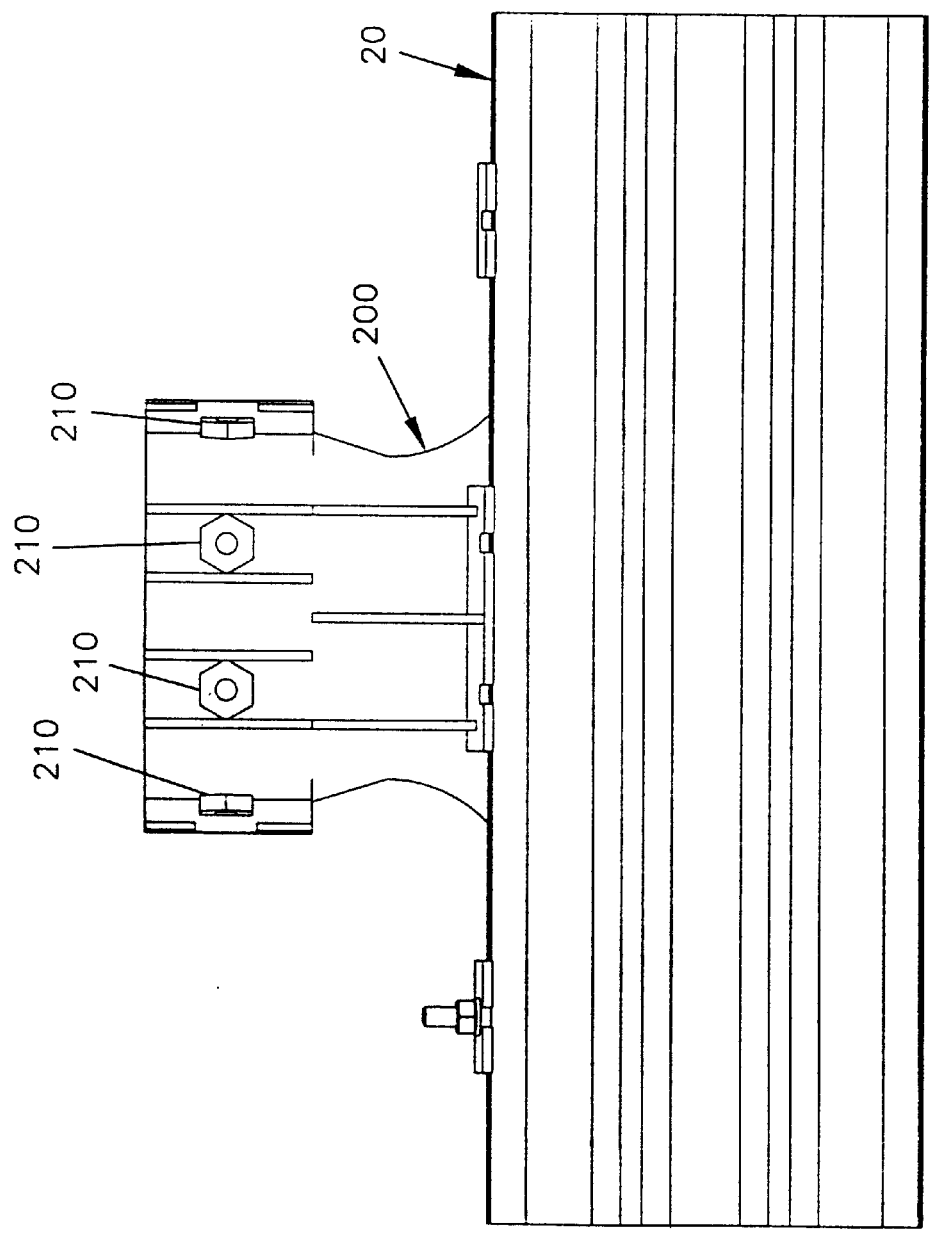
FIG. 15 is a bottom view of the second embodiment.

Exit trough 100 includes a bracket portion 102 including an outer projecting member 104, an inner projecting member 106, and a connecting member 108. Bracket portion 102 generally defines a U-shape for receipt of a portion of side 24 such that top edge 30 is positioned adjacent to connecting member 108. Exit trough 100 conveniently and securely mounts to lateral trough section 20 via one or more fasteners 170 positioned through outer projecting member 104 and engaged with attachment member 34 of lateral trough section 20, as shown in FIGS. 2, 3, and 5–8. As shown in FIGS. 2 and 3, outer projecting member 104 includes separate spaced apart portions 104a, 104b, 104c. Alternatively, the individual portions 104a–c could be constructed as a single piece. Portion 104a includes a slot 172 for receipt of fastener 170 during assembly. The other portions 104b and 104c include similar slots.

For protection of the optical fiber cables, inner projecting member 106 of bracket portion 102 includes tapered ends 110, 112, and a tapered middle 114. Bracket portion 102 generally extends from a first end 116 to a second end 118. A middle 120 is positioned between the first and second ends 116, 118. At first and second ends 116, 118, two cable lead-ins 124, 134 are provided. First lead-in 124 includes an upper surface portion 126 having an upwardly curved shape. A downwardly depending flange 128 extends toward bottom 28 of lateral trough section 20. Flange 128 is spaced apart from inner projecting member 106 of bracket portion 102 to define a cable pathway 130. Second lead-in 134 at an opposite end of bracket portion 102 faces in an opposite direction to first lead-in 124. Second lead-in 134 includes a similarly configured upwardly curved surface 136, and a downwardly depending flange 138 defining a cable pathway 140 for cables entering exit trough 100 from an opposite end of lateral trough section 20.

Exit trough 100 includes an exit trough portion 144 extending from bracket portion 102 at middle 120 away from lateral trough section 20. Exit trough portion 144 includes a bottom trough surface 146 and upstanding sides 148, 150 on opposite sides of bottom trough surface 146. Generally bottom trough surface 146 extends upwardly and away from top edge 30 of lateral trough section 20, and includes a convex shape. Upstanding sides 148, 150 extend from each respective lead-in 124, 134, and also define convex shapes. Exit trough portion 144 defines a cable pathway 152 linked to cable pathway 22 of lateral trough section 20 via cable pathways 130, 140 of lead-ins 124, 134.

In exit trough 100, exit trough portion 144 links lateral trough section 20 to a downspout 160. Downspout 160 generally provides a cable pathway for cable exiting in a downward direction relative to lateral trough section 20. Downspout 160 is supported by two side ribs 164 and a center rib 166 connected to bracket portion 104b.

With exit trough 100 mounted to lateral trough section 20, cable extending generally horizontally to the ground through lateral trough section 20 is allowed to route upwardly and away from lateral trough section 20, and then to route downwardly through downspout 160 for connection to optical transmission equipment, or other uses. Downspout 160 is connectable via any suitable means to other cable routing components, such as vertical troughs or conduit, as desired. The various curves provided with exit trough 100 help protect the optical fiber cables from being bent beyond a minimum radius of curvature.

Referring now to FIGS. 9–16, a second embodiment of an exit trough 200 is shown. Like parts to parts in exit trough 100 are identified by the same reference numerals noted above for exit trough 100. Exit trough 200 differs in two main respects. First, instead of downspout 160, second exit trough 200 includes a horizontal portion 202 leading from exit trough portion 244. Horizontal portion 202 includes a generally horizontal bottom 204 and two upstanding sides 206, 208 leading from exit trough portion 244. Two side ribs 264, and a center rib 266 extending from bracket portion 102 support horizontal portion 202. Horizontal portion 202 is useful for linking lateral trough section 20 to other cable routing components interconnectable to horizontal portion 202 through any suitable means. Fastener recesses 210 are shown as one example of suitable structures for mounting to other components.

A second main difference between the second exit trough 200 and the first exit trough 100, is that lead-ins 224, 234 and exit trough portion 244 are sized to define larger cable pathways 230, 240, and 252. Specifically, upper surface portions 226, 236 and flanges 228, 238 are sized for defining the larger pathways 230, 240 relative to pathways 130, 140 of first exit trough 100. Also upstanding sides 248, 250 are taller and spaced further apart to define larger pathway 252 relative to pathway 152 of first exit trough 100. This illustrates that relative sizes of the features of exit troughs 100, 200 can be varied depending on the cable routing needs in the system.

Each of the disclosed exit troughs 100, 200 allows: for exit pathways from the lateral trough section 20 without modification to the lateral trough section 20. This is useful during initial system setup, and also during modifications of the system at later dates. Exit troughs 100, 200 can be added at any time quickly and easily. Cable damage is avoided since any cables in lateral trough section 20 are not disturbed and do not have to be moved when exit troughs 100, 200 are added. Also, simple fasteners are all that is needed to mount the bracket portion 102 of the exit troughs 100, 200 to the lateral trough section 20. In addition to the downspout 160, and the horizontal portion 202, other directional components are possible from exit trough portions 144, 244 of each exit trough 100, 200.

Having described the present invention in a preferred embodiment, modifications and equivalents may occur to one skilled in the art. It is intended that such modifications and equivalents shall be included within the scope of the claims which are appended hereto.

What is claimed is:

1. A cable exit trough mountable to a lateral trough section, the lateral trough section including an upstanding side terminating at a top edge, the exit trough comprising:
   an upper portion having a bottom trough surface and two curved side walls extending
   from opposite sides of the bottom trough surface to define a cable exit pathway;
   a lower portion engageable with the lateral trough section;
   the cable exit trough being releasably mountable to the lateral trough section without cutting the top edge and corresponding upstanding side;
   wherein, when mounted to the lateral trough, the cable exit pathway extends transversely over the top edge of the upstanding side of the lateral trough section so that cable can be routed upwardly from the lateral trough section over the top edge of the lateral trough section.

2. A cable exit trough mountable to a lateral trough section, the lateral trough section defining a cable pathway and having an upstanding side of substantially uniform height; the exit trough comprising:

a body having a bottom surface, the bottom surface including a curved portion leading upwardly with respect to the lateral trough section while maintaining a cable minimum bend radius;

the body further having an upper surface positioned above a bottom of the lateral trough section when the exit trough is mounted to the lateral trough section, the upper surface having a curved portion which leads upwardly with respect to the lateral trough, the curved portion being sufficiently curved to maintain the cable minimum bend radius;

wherein, when mounted to the lateral trough, the bottom surface of the exit trough defines a curved cable exit pathway that leads over the upstanding side of the lateral trough section.

3. The cable exit trough of claim 2 further comprising first and second side wall surfaces extending from the bottom surface, each of the side wall surfaces having a curved portion which leads from a direction generally parallel to the cable pathway toward a direction generally perpendicular to the cable pathway while maintaining the cable minimum bend radius.

4. The cable exit trough of claim 2 wherein the upper surface extends perpendicularly from the side wall surface and faces the bottom of the lateral trough section when the exit trough is mounted to the lateral trough section.

5. The cable exit trough of claim 2 wherein the upper surface is a,first upper surface and wherein the cable exit trough further comprises a second upper surface positioned above the bottom of the lateral trough section when the exit trough is mounted to the lateral trough section, the second upper surface having a curved portion which leads upwardly with respect to the lateral trough, the curved portion being sufficiently curved to maintain the cable minimum bend radius, wherein the first and second upper surfaces are located toward opposite ends of the exit trough.

6. The cable exit trough of claim 2 further comprising a flange depending downwardly from the upper surface.

7. The cable exit trough of claim 2 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

8. A cable exit trough mountable to a lateral trough section, the lateral trough section including an upstanding side having substantially uniform height and terminating at a top edge, the exit trough comprising:

an upper portion having a curved bottom trough surface and two curved side walls extending from opposite sides of the bottom trough surface to define a cable exit pathway, the curved bottom trough surface being sufficiently curved to maintain a cable minimum bend radius;

the cable exit trough being releasably mountable to the lateral trough section;

wherein, when mounted to the lateral trough, the cable exit pathway extends transversely over the top edge of the upstanding side of the lateral trough section so that cable can be routed upwardly from the lateral trough section over the top edge of the lateral trough section.

9. The cable exit trough of claim 8 further comprising a lower portion including a corner section that assists in defining the relative positioning of the exit trough to the lateral trough section, wherein, when the exit trough is mounted to the lateral trough, the corner section is positioned adjacent the top edge of the upstanding side of the lateral trough section.

10. The cable exit trough of claim 9 wherein the corner section includes an outer projecting member and top member, the top member positioned above the top edge and the outer projecting member positioned adjacent an outside surface of the top edge.

11. The cable exit trough of claim 10 wherein the cable exit trough further comprises a first flange that extends downward from an outer portion of the first cable transition surface to define a first cable guiding pathway, and a second flange that extends downward from an outer portion of the second cable transition surface to define a second cable guiding pathway wherein each of the cable guiding pathways are in communication with the cable exit pathway.

12. The cable exit trough of claim 9 wherein the corner section includes an inner projecting member and top member, the top member positioned above the top edge and the inner projecting member positioned adjacent an inside surface of the top edge.

13. The cable exit trough of claim 8 further comprising a lower portion including means for positioning the exit trough relative to the lateral trough section.

14. The cable exit trough of claim 13 wherein the means for positioning is a U-shaped bracket.

15. The cable exit trough of claim 13 wherein the means for positioning is an L-shaped bracket.

16. The cable exit trough of claim 8 further comprising a lower portion defining a chamber section that assists in defining the relative positioning of the exit trough to the lateral trough section, wherein, when the exit trough is mounted to the lateral trough, the chamber section is positioned adjacent the top edge of the upstanding side of the lateral trough section.

17. The cable exit trough of claim 16 wherein a U-shaped channel defines the chamber section.

18. The cable exit trough of claim 8 wherein the cable exit trough further comprises first and second cable transition surfaces to gradually transition cables from the lateral trough to the cable exit trough.

19. The cable exit trough of claim 8 further comprising a lower portion including a guiding member that assists in defining the relative positioning of the exit trough to the lateral trough section, wherein, when the exit trough is mounted to the lateral trough, the guiding member is positioned adjacent the top edge of the upstanding side of the lateral trough section.

20. The cable exit trough of claim 8 wherein the lateral trough section includes at least one attachment member positioned on one of the upstanding sides, and wherein the cable exit trough is configured to engage the attachment member when the cable exit trough is releasably secured to the lateral trough section.

21. The cable exit trough of claim 8 further including a downspout, wherein the cable exit pathway of the upper portion links the lateral trough section to the downspout so that the cable can be routed upwardly from the lateral trough section and then over the top edge of the lateral trough section, and then downwardly through the downspout.

22. A cable routing system comprising:
- a lateral trough section, the lateral trough section having a bottom portion and two upstanding sides extending from the bottom portion to define a cable pathway, at least one of the upstanding sides having substantially uniform height and terminating at a top edge spaced from the bottom portion; and
- a cable exit trough, the cable exit trough including a cable guiding portion having a curved cable exit surface and two side walls extending therefrom to define a cable exit pathway;
  - wherein the cable exit trough is releasably mountable to the lateral trough section with the cable exit pathway extending over the top edge of the lateral trough section so that cable can be routed upwardly from the lateral trough section, and then over the top edge of the lateral trough section.

23. The cable routing system of claim 22 wherein the cable exit trough further comprises a lower portion including a corner section that assists in defining the relative positioning of the exit trough to the lateral trough section, wherein, when the exit trough is mounted to the lateral trough, the corner section is positioned adjacent the top edge of the upstanding side of the lateral trough section.

24. The cable routing system of claim 23 wherein the corner section includes an inner projecting member and top member, the top member positioned above the top edge and the inner projecting member positioned adjacent an inside surface of the top edge.

25. The cable routing system of claim 23 wherein the corner section includes an outer projecting member and top member, the top member positioned above the top edge and the outer projecting member positioned adjacent an outside surface of the top edge.

26. The cable routing system of claim 22 wherein the cable exit trough further comprises a lower portion defining a chamber section that assists in defining the relative positioning of the exit trough to the lateral trough section, wherein, when the exit trough is mounted to the lateral trough, the chamber section is positioned adjacent the top edge of the upstanding side of the lateral trough section.

27. The cable routing system of claim 26 wherein the chamber section includes a U-shaped bracket for receipt of the top edge of the upstanding side of the lateral trough section.

28. The cable routing system of claim 22 wherein the cable exit trough further comprises a lower portion including means for positioning the exit trough relative to the lateral trough section.

29. The cable routing system of claim 28 wherein the means for positioning is an L-shaped bracket.

30. The cable routing system of claim 28 wherein the means for positioning is a U-shaped bracket.

31. The cable routing system of claim 22 wherein the cable exit trough further comprises a lower portion including a guiding member that assists in defining the relative positioning of the exit trough to the lateral trough section, wherein, when the exit trough is mounted to the lateral trough, the guiding member is positioned adjacent the top edge of the upstanding side of the lateral trough section.

32. The cable routing system of claim 22 wherein the cable exit trough further comprises first and second cable transition surfaces to gradually transition cables from the lateral trough to cable exit trough.

33. The cable routing system of claim 32 wherein the cable exit trough further comprises a first flange that extends downwardly from an outer portion of the first cable transition surface to define a first cable guiding pathway, and a second flange that extends downwardly from an outer portion of the second cable transition surface to define a second cable guiding pathway wherein each of the cable guiding pathways are in communication with the cable exit pathway.

34. The cable routing system of claim 22 wherein the lateral trough section includes at least one attachment member positioned on one of the upstanding sides, and wherein the cable exit trough is configured to engage the attachment member when the cable exit trough is releasably secured to the lateral trough section.

35. The cable routing system of claim 22 wherein the cable exit trough further includes a downspout, wherein the cable exit pathway of the upper portion links the lateral trough to the downspout so that the cable can be routed upwardly from the lateral trough section and then over. the top edge of the lateral trough section, and then downwardly through the downspout.

36. A cable routing system comprising:
- a lateral trough section, the lateral trough section having a bottom portion and two upstanding sides extending from the bottom portion to define a cable pathway, the upstanding sides terminating at a top edge spaced from the bottom portion; and
- a cable exit trough, the cable exit trough including a cable guiding portion having a cable exit surface and two side walls extending therefrom to define a cable exit pathway, the exit surface and at least one sidewall being curved to maintain a cable minimum bend radius;
  - wherein the cable exit trough is releasably mountable to the lateral trough section with the cable exit pathway extending over the top edge of the lateral trough section so that cable can be routed upwardly from the lateral trough section, and then over the top edge of the lateral trough section;
  - wherein the cable exit trough mounts to the lateral trough section without cutting the top edge and corresponding upstanding side.

37. A cable exit trough mountable to a lateral trough section, the lateral trough section defining a cable pathway and having an upstanding side of substantially uniform height, the exit trough comprising:
- a bottom surface having a curved portion leading upwardly with respect to the lateral trough section while maintaining a cable minimum bend radius;
- a side wall surface extending from the bottom surface, the side wall surface having a curved portion leading from a direction generally parallel to the cable pathway toward a direction generally perpendicular to the cable pathway while maintaining the cable minimum bend radius;
  - wherein, when mounted to the lateral trough, the bottom and side wall surfaces of the exit trough define a cable exit pathway that leads over the upstanding side of the lateral trough section.

38. The cable exit trough of claim 37 wherein any surface of the cable exit trough extends into the lateral trough section.

39. The cable exit trough of claim 37 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

40. The cable exit trough of claim 37 wherein the exit trough is releasably mountable to the lateral trough section.

41. The cable exit trough of claim 40 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

42. The cable exit trough of claim 37 wherein the side wall surface is a first side wall surface and wherein the exit trough further includes a second side wall surface extending from the bottom surface and spaced from the first side wall surface, the second side wall surface having a curved portion which leads from a direction generally parallel to the cable pathway toward a direction generally perpendicular to the cable pathway while maintaining the cable minimum bend radius.

43. The cable exit trough of claim 42 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

44. The cable exit trough of claim 42 wherein a portion of the second side wall surface opposes a portion of the first side wall surface.

45. The cable exit trough of claim 37 further including an upper surface extending from the exit trough, the upper surface being positioned above a bottom of the lateral trough section when the exit trough is mounted to the lateral trough section and serving to guide a cable toward the bottom and side wall surfaces.

46. The cable exit trough of claim 45 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

47. The cable exit trough of claim 37 further including an upper surface extending from the side wall surface, the upper surface being positioned above a bottom of the lateral trough section when the exit trough is mounted to the lateral trough section.

48. The cable exit trough of claim 47 wherein the upper surface is curved.

49. The cable exit trough of claim 47 wherein the upper surface extends perpendicularly from the side wall surface and faces the bottom of the lateral trough section when the exit trough is mounted to the lateral trough section.

50. The cable exit trough of claim 47 further comprising a flange depending downwardly from the upper surface.

51. The cable exit trough of claim 37 wherein the bottom surface extends into the lateral trough section.

52. A cable routing system comprising:
a lateral trough section, the lateral trough section having a bottom and two upstanding sides extending from the bottom to define a cable pathway, at least one of the upstanding sides having substantially uniform height; and
a cable exit trough removably mounted to the lateral trough section, the cable exit trough including:
    a bottom surface having a curved portion leading upwardly with respect to the lateral trough section while maintaining a cable minimum bend radius;
    a side wall surface extending from the bottom surface, the side wall surface having a curved portion to guide a cable in a direction transverse to the upstanding side of the lateral trough section while maintaining the cable minimum bend radius, the side wall surface with the bottom surface defining a cable exit pathway;
    wherein the cable exit pathway extends over the upstanding side of the lateral trough section having substantially uniform height.

53. The cable routing system of claims 52 wherein the curved portion of the bottom surface of the exit trough is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

54. A cable routing system comprising:
a lateral trough section, the lateral trough section having a bottom and two upstanding sides extending from the bottom to define a cable pathway, at least one of the upstanding sides having substantially uniform height; and
a cable exit trough mounted to the lateral trough section, the cable exit trough including:
    a bottom surface having a curved portion leading upwardly with respect to the lateral trough section while maintaining a cable minimum bend radius;
    a side wall surface extending from the bottom surface, the side wall surface having a curved portion leading from a direction generally parallel to the cable pathway toward a direction generally perpendicular to the cable pathway while maintaining the cable minimum bend radius, the side wall surface with the bottom surface defining a cable exit pathway;
an upper surface positioned above a bottom of the lateral trough section when the exit trough is mounted to the lateral trough section, the upper surface having a curved portion which leads upwardly with respect to the lateral trough, the curved portion being sufficiently curved to maintain the cable minimum bend radius; and
    wherein the cable exit pathway extends over the upstanding side of the lateral trough section having substantially uniform height.

55. The cable routing system of claim 54 further comprising a flange depending downwardly from the upper surface.

56. The cable routing system of claim 54 wherein the upper surface extends perpendicularly from the side wall surface and faces the bottom of the lateral trough section when the exit trough is mounted to the lateral trough section.

57. An optical fiber cable trough mountable to a lateral trough section, the lateral trough section defining a cable pathway and having an upstanding side of substantially uniform height, the cable trough comprising:
a bottom surface having a curved portion leading upwardly with respect to the lateral trough section while maintaining a cable minimum bend radius;
a side wall surface extending from the bottom surface, the side wall surface having a curved portion leading from a direction generally parallel to the cable pathway toward a direction generally perpendicular to the cable pathway while maintaining the cable minimum bend radius;
wherein, when mounted to the lateral trough, the bottom and side wall surfaces of the cable trough define a cable pathway that leads over the upstanding side of the lateral trough section.

58. The cable trough of claim 57 wherein the side wall surface is a first side wall surface and wherein the cable trough further includes a second side wall surface extending from the bottom surface and spaced from the first side wall surface, the second side wall surface having a curved portion which leads from a direction generally parallel to the cable pathway toward a direction generally perpendicular to the cable pathway while maintaining the cable minimum bend radius.

59. The cable trough of claim 58 wherein the curved portion of the bottom surface is a first curved portion and wherein the bottom surface includes a second curved portion leading in a downward direction relative to the lateral trough section while maintaining a cable minimum bend radius.

60. The cable trough of claim 58 wherein a portion of the second side wall surface opposes a portion of the first side wall surface.

61. The cable trough of claim 57 further including a curved upper surface extending from the cable trough over a bottom of the lateral trough section when the cable trough is mounted to the lateral trough section.

62. The cable trough of claim 61 wherein the upper surface extends perpendicularly from the side wall surface.

63. The cable trough of claim 62 further comprising a flange depending downwardly from the upper surface.

64. The cable trough of claim 57 wherein the cable trough is releasably mountable to the lateral trough section.

65. The cable trough of claim 64 wherein the curved portion of the bottom surface is a first curved portion and wherein the bottom surface includes a second curved portion leading in a downward direction relative to the lateral trough section while maintaining a cable minimum bend radius.

66. The cable trough of claim 57 wherein the curved portion of the bottom surface is a first curved portion and wherein the bottom surface includes a second curved portion leading in a downward direction relative to the lateral trough section while maintaining a cable minimum bend radius.

67. The cable trough of claim 57 wherein the bottom surface extends from inside the lateral trough section to outside the lateral trough section.

* * * * *

UNITED STATES PATENT AND TRADEMARK OFFICE
CERTIFICATE OF CORRECTION

PATENT NO.      : 6,597,854 B2                                                Page 1 of 1
DATED           : July 22, 2003
INVENTOR(S)     : Haataja et al.

It is certified that error appears in the above-identified patent and that said Letters Patent is hereby corrected as shown below:

Column 6,
Lines 6, 9 and 24, "comer" should read -- corner --

Column 7,
Lines 20, 26 and 31, "comer" should read -- corner --

Signed and Sealed this

Twenty-eighth Day of October, 2003

JAMES E. ROGAN
*Director of the United States Patent and Trademark Office*

(12) INTER PARTES REEXAMINATION CERTIFICATE (980th)
United States Patent
Haataja et al.

(10) Number: US 6,597,854 C1
(45) Certificate Issued: *Oct. 29, 2014

(54) OPTICAL CABLE EXIT TROUGH

(75) Inventors: Timothy Jon Haataja, Prior Lake, MN (US); Thomas Walter Kampf, Minnetonka, MN (US)

(73) Assignee: ADC Telecommunications, Inc., Minnetonka, MN (US)

Reexamination Request:
No. 95/000,411, Nov. 6, 2008

Reexamination Certificate for:
Patent No.: 6,597,854
Issued: Jul. 22, 2003
Appl. No.: 09/745,299
Filed: Dec. 20, 2000

Certificate of Correction issued Oct. 28, 2003

( * ) Notice: This patent is subject to a terminal disclaimer.

Related U.S. Application Data

(60) Continuation of application No. 09/354,594, filed on Jul. 16, 1999, now Pat. No. 6,192,181, which is a division of application No. 08/971,421, filed on Nov. 17, 1997, now Pat. No. 5,937,131.

(51) Int. Cl.
*G02B 6/44* (2006.01)

(52) U.S. Cl.
USPC ............ 385/136; 385/134; 385/135; 385/137

(58) Field of Classification Search
None
See application file for complete search history.

(56) References Cited

To view the complete listing of prior art documents cited during the proceeding for Reexamination Control Number 95/000,411, please refer to the USPTO's public Patent Application Information Retrieval (PAIR) system under the Display References tab.

*Primary Examiner* — Peter C. English

(57) ABSTRACT

A cable exit trough is mountable to a lateral trough section either during initial assembly of the cable routing system, or at a later date. The exit trough includes a bracket portion mountable to the top edge of one of the sides of the lateral trough section. Two lead-ins are provided to lead the cable in an upward direction from the lateral trough section to the exit trough. The exit trough includes an exit trough portion extending from the bracket portion upwardly away from the lateral: trough section. The exit trough portion includes a convexly curved bottom trough surface, and two convexly curved upstanding sides. The exit trough portion and the lead-ins define a cable pathway from the lateral trough section to an exit point of the exit trough portion which can either lead downwardly relative to the lateral trough section, or horizontally.

Attention is directed to the decision of *ADC Telecommunications, Inc. v. Panduit Corp.*, US District-Minnesota, No. 0:07cv04452, stayed pending reexamination. NO FINAL DECISION AFFECTING REEXAMINATION. This reexamination may not have resolved all questions raised by this decision. See 37 CFR 1.552(c) for *ex parte* reexamination and 37 CFR 1.906(c) for *inter partes* reexamination.

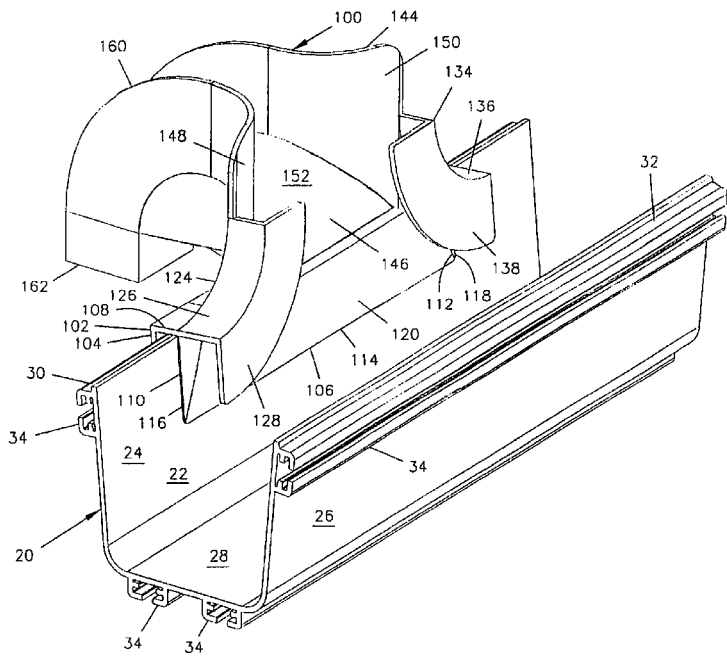

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2-7 and 54-56 is confirmed.

Claims 1 and 36 are cancelled.

Claims 8-22, 37-52 and 57-67 are determined to be patentable as amended.

Claims 23-35 and 53, dependent on an amended claim, are determined to be patentable.

New claims 68-78 are added and determined to be patentable.

8. A cable exit trough *system for routing cables horizontal to the ground and then vertically towards the ground, the system comprising:* a lateral trough section *and a cable exit trough* mountable to [a] *the* lateral trough section, *the lateral trough section being horizontal to the ground to define a cable pathway so that cables routed through the lateral trough section also run horizontal to the ground along the cable pathway, the lateral trough section being longer than the longest dimension of the cable exit trough in a direction horizontal to the ground along the cable pathway when the cable exit trough is mounted to the lateral trough section,* the lateral trough section including [an] *two* upstanding sides, *each side* having *the same* substantially uniform height [and] *from one end of the lateral trough section to an opposite end of the lateral trough section so that each upstanding side has a substantially uniform cross-section along its entire length, each side* terminating at a top edge, *wherein* the exit trough [comprising] *comprises*:

an upper portion having a curved bottom trough surface and two curved side walls extending from opposite sides of the bottom trough surface to define a cable exit pathway, the curved bottom trough surface *and the two curved side walls being sufficiently curved to maintain a cable minimum bend radius for cables entering the exit trough from opposite ends of the lateral trough section*; *wherein when mounted to the lateral trough section the curved bottom surface while maintaining a cable minimum bend radius transitions from a first portion in a substantially vertical orientation to the ground to a second portion in a substantially horizontal orientation to the ground and then to a third portion in a substantially vertical orientation to the ground, and wherein when mounted to the lateral trough section the second portion of the curved bottom trough surface is higher than both upstanding sides of the lateral trough section;* the cable exit trough being releasably mountable to the lateral trough section; wherein, when mounted to the lateral trough *section*, the cable exit pathway extends transversely over the top edge of *one of* the upstanding sides of the lateral trough section so that cable can be routed upwardly *away from the ground and* from the lateral trough section over the top edge of the lateral trough section *and then downwardly toward the ground*.

9. The cable exit trough *system* of claim 8 further comprising a lower portion including a corner section that assists in defining the relative positioning of the exit trough to the lateral trough section, wherein, when the exit trough is mounted to the lateral trough, the corner section is positioned adjacent the top edge of the upstanding side of the lateral trough section.

10. The cable exit trough *system* of claim 9 wherein the corner section includes an outer projecting member and top member, the top member positioned above the top edge and the outer projecting member positioned adjacent an outside surface of the top edge.

11. The cable exit trough *system* of claim 10 wherein the cable exit trough further comprises a first flange that extends downward from an outer portion of the first cable transition surface to define a first cable guiding pathway, and a second flange that extends downward from an outer portion of the second cable transition surface to define a second cable guiding pathway wherein each of the cable guiding pathways are in communication with the cable exit pathway.

12. The cable exit trough *system* of claim 9 wherein the corner section includes an inner projecting member and top member, the top member positioned above the top edge and the inner projecting member positioned adjacent an inside surface of the top edge.

13. The cable exit trough *system* of claim 8 further comprising a lower portion including means for positioning the exit trough relative to the lateral trough section.

14. The cable exit trough *system* of claim 13 wherein the means for positioning is a U-shaped bracket.

15. The cable exit trough *system* of claim 13 wherein the means for positioning is an L-shaped bracket.

16. The cable exit trough *system* of claim 8 further comprising a lower portion defining a chamber section that assists in defining the relative positioning of the exit trough to the lateral trough section, wherein, when the exit trough is mounted to the lateral trough, the chamber section is positioned adjacent the top edge of the upstanding side of the lateral trough section.

17. The cable exit trough *system* of claim 16 wherein a U-shaped channel defines the chamber section.

18. The cable exit trough *system* of claim 8 wherein the cable exit trough further comprises first and second cable transition surfaces to gradually transition cables from the lateral trough to the cable exit trough.

19. The cable exit trough *system* of claim 8 further comprising a lower portion including a guiding member that assists in defining the relative positioning of the exit trough to the lateral trough section, wherein, when the exit trough is mounted to the lateral trough, the guiding member is positioned adjacent the top edge of the upstanding side of the lateral trough section.

20. The cable exit trough *system* of claim 8 wherein the lateral trough section includes at least one attachment member positioned on one of the upstanding sides, and wherein the cable exit trough is configured to engage the attachment member when the cable exit trough is releasably secured to the lateral trough section.

21. The cable exit trough *system* of claim 8 further including a downspout, wherein the cable exit pathway of the upper portion links the lateral trough section to the downspout so that the cable can be routed upwardly from the lateral trough section and then over the top edge of the lateral trough section, and then downwardly through the downspout.

22. A cable routing system comprising:
a lateral trough section, the lateral trough section having a bottom portion and two upstanding sides extending from the bottom portion to define a cable pathway, at least one of the upstanding sides having substantially uniform height and terminating at a top edge spaced from the bottom portion; and
a cable exit trough, the cable exit trough including a cable guiding portion having a curved cable exit surface and two side walls extending therefrom to define a cable exit pathway;
wherein when the cable exit trough is mounted to the lateral trough section, the lateral trough section is longer than the longest dimension of the cable exit trough in a direction horizontal to the ground along the cable pathway, *and the at least one upstanding side having a substantially uniform height from one end of the lateral trough section to an opposite end of the lateral trough section,* wherein the cable exit trough is releasably mountable to the lateral trough section *without cutting the at least one upstanding side* with the cable exit pathway extending over the top edge of the lateral trough section so that cable can be routed upwardly from the lateral trough section, and then over the top edge of the lateral trough section;
*wherein the cable exit trough further includes an upper surface, wherein the upper surface curves upward relative to the bottom portion of the lateral trough section and defines a top boundary of at least a portion of a cable path.*

37. A cable exit trough *system for routing cables horizontal to the ground and then vertically towards the ground, the system* comprising:
a lateral trough section and a cable exit trough mountable to [a] *the* lateral trough section, the lateral trough section defining a cable pathway [and] *horizontal to the ground so that cables routed through the lateral trough section also run horizontal to the ground along the cable pathway, the lateral trough section being longer than the longest dimension of the cable exit trough in a direction horizontal to the ground along the cable pathway when the cable exit trough is mounted to the lateral trough section, the lateral trough section* having an upstanding side of substantially uniform height *from one end of the lateral trough section to an opposite end of the lateral trough section so that the upstanding side has a substantially uniform cross-section along its entire length*, the exit trough comprising:
a bottom surface having a curved portion leading upwardly with respect to the lateral trough section *from a position above the upstanding side to a position outside the lateral trough section* while maintaining a cable minimum bend radius;
a side wall surface extending from the bottom surface, the side wall surface having a curved portion leading *cables* from a direction generally parallel to the cable pathway toward a direction generally perpendicular to the cable pathway while maintaining the cable minimum bend radius;
*wherein, when mounted to the lateral trough section, the bottom surface, while maintaining a minimum bend radius, transitions to substantially vertical to guide cables exiting the lateral trough section to a substantially vertical orientation to the ground;*
wherein, when mounted to the lateral trough *section*, the bottom and side wall surfaces of the exit trough define a cable exit pathway that leads over the upstanding side of the lateral trough section *so that cables can be routed upwardly away from the ground and from the lateral trough section, over the upstanding side of the lateral trough section.*

38. The cable exit trough *system* of claim 37 wherein any surface of the cable exit trough extends into the lateral trough section.

39. The cable exit trough *system* of claim 37 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

40. The cable exit trough *system* of claim 37 wherein the exit trough is releasably mountable to the lateral trough section.

41. The cable exit trough *system* of claim 40 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

42. The cable exit trough *system* of claim 37 wherein the side wall surface is a first side wall surface and wherein the exit trough further includes a second side wall surface extending from the bottom surface and spaced from the first side wall surface, the second side wall surface having a curved portion which leads from a direction generally parallel to the cable pathway toward a direction generally perpendicular to the cable pathway while maintaining the cable minimum bend radius.

43. The cable exit trough *system* of claim 42 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

44. The cable exit trough *system* of claim 42 wherein a portion of the second side wall surface opposes a portion of the first side wall surface.

45. The cable exit trough *system* of claim 37 further including an upper surface extending from the exit trough, the upper surface being positioned above a bottom of the lateral trough section when the exit trough is mounted to the lateral trough section and serving to guide a cable toward the bottom and side wall surfaces.

46. The cable exit trough *system* of claim 45 wherein the curved portion of the bottom surface is a first curved portion and wherein the bottom surface includes a second curved portion located outside the lateral trough section when the exit trough is mounted to the lateral trough section, the second curved portion leading in a downward direction relative to the lateral trough section while maintaining a cable minimum bend radius.

47. The cable exit trough *system* of claim 37 further including an upper surface extending from the side wall surface, the upper surface being positioned above a bottom of the lateral trough section when the exit trough is mounted to the lateral trough section.

48. The cable exit trough *system* of claim 47 wherein the upper surface is curved.

49. The cable exit trough *system* of claim 47 wherein the upper surface extends perpendicularly from the side wall surface and faces the bottom of the lateral trough section when the exit trough is mounted to the lateral trough section.

50. The cable exit trough *system* of claim 47 further comprising a flange depending downwardly from the upper surface.

51. The cable exit trough *system* of claim 37 wherein the bottom surface extends into the lateral trough section.

52. A cable routing system comprising:
a lateral trough section, the lateral trough section having a bottom and two upstanding sides extending from the bottom to define a cable pathway, at least one of the upstanding sides having substantially uniform height; and
a cable exit trough removably mounted to the lateral trough section, the cable exit trough including:
a bottom surface having a curved portion leading upwardly with respect to the lateral trough section while maintaining a cable minimum bend radius, *the curved portion being curved in a direction substantially perpendicular to the lateral trough section*;
a side wall surface extending from the bottom surface, the side wall surface having a curved portion to guide a cable in a direction transverse to the upstanding side of the lateral trough section while maintaining the cable minimum bend radius, the side wall surface with the bottom surface defining a cable exit pathway; *wherein when the cable exit trough is mounted to the lateral trough section, the lateral trough section is longer than the longest dimension of the cable exit trough in a direction horizontal to the ground along the cable pathway, and the at least one upstanding side having a substantially uniform height from one end of the lateral trough section to an opposite end of the lateral trough section, wherein the cable exit pathway extends over the upstanding side of the lateral trough section having substantially uniform height, the curved portion of the bottom surface leading upwardly and away from the lateral trough section after extending over the at least one upstanding side of the lateral trough section; and*
*wherein, when the exit trough is mounted to the lateral trough section, a portion of the exit trough is positioned above and at least partially facing the bottom of the lateral trough section and defines a top boundary of at least a portion of a cable path for cables routing through the cable exit trough.*

57. An optical fiber cable trough *system for routing cables horizontal to the ground and then vertically towards the ground, the system comprising:*
a lateral trough section and an optical fiber cable exit trough mountable to [a] *the* lateral trough section, the lateral trough section defining a cable pathway [and] *being horizontal to the ground so that cables routed through the lateral trough section also run horizontal to the ground along the cable pathway, the lateral trough section being longer than the longest dimension of the cable exit trough in a direction horizontal to the ground along the cable pathway when the cable exit trough is mounted to the lateral trough section, the lateral trough section* having an upstanding side of substantially uniform height *along its length*, the cable *exit* trough comprising:
a bottom surface having a curved portion leading upwardly with respect to the lateral trough section while maintaining a cable minimum bend radius, *the curved portion of the bottom surface curving from a substantially vertical orientation to at least a substantially horizontal orientation as the curved portion leads in a direction away from the lateral trough section*;
a side wall surface extending from the bottom surface, the side wall surface having a curved portion leading from a direction generally parallel to the cable pathway toward a direction generally perpendicular to the cable pathway while maintaining the cable minimum bend radius; wherein, when mounted to the lateral trough, the bottom and side wall surfaces of the cable trough define a cable pathway that leads over the upstanding side of the lateral trough section.

58. The cable trough *system* of claim 57 wherein the side wall surface is a first side wall surface and wherein the cable trough further includes a second side wall surface extending from the bottom surface and spaced from the first side wall surface, the second side wall surface having a curved portion which leads from a direction generally parallel to the cable pathway toward a direction generally perpendicular to the cable pathway while maintaining the cable minimum bend radius.

59. The cable trough *system* of claim 58 wherein the curved portion of the bottom surface is a first curved portion and wherein the bottom surface includes a second curved portion leading in a downward direction relative to the lateral trough section while maintaining a cable minimum bend radius.

60. The cable trough *system* of claim 58 wherein a portion of the second side wall surface opposes a portion of the first side wall surface.

61. The cable trough *system* of claim 57 further including a curved upper surface extending from the cable trough over a bottom of the lateral trough section when the cable trough is mounted to the lateral trough section.

62. The cable trough *system* of claim 61 wherein the upper surface extends perpendicularly from the side wall surface.

63. The cable trough *system* of claim 62 further comprising a flange depending downwardly from the upper surface.

64. The cable trough *system* of claim 57 wherein the cable trough is releasably mountable to the lateral trough section.

65. The cable trough *system* of claim 64 wherein the curved portion of the bottom surface is a first curved portion and wherein the bottom surface includes a second curved portion leading in a downward direction relative to the lateral trough section while maintaining a cable minimum bend radius.

66. The cable trough *system* of claim 57 wherein the curved portion of the bottom surface is a first curved portion and wherein the bottom surface includes a second curved portion leading in a downward direction relative to the lateral trough section while maintaining a cable minimum bend radius.

67. The cable trough *system* of claim 57 wherein the bottom surface extends from inside the lateral trough section to outside the lateral trough section.

*68. The cable exit trough of claim 2, further comprising two curved side walls positioned on opposite sides of the bottom surface, the curved bottom surface and the two curved side walls being sufficiently curved to maintain a cable minimum bend radius for cables entering the exit trough from opposite ends of the lateral trough section.*

*69. The cable exit trough of claim 2, wherein the curved portion of the bottom surface is curved in a direction substantially perpendicular to the lateral trough section.*

*70. The cable exit trough of claim 2, wherein the curved portion of the bottom surface curves from a substantially vertical orientation to at least a substantially horizontal orientation.*

71. The cable exit trough of claim 70, wherein the curved portion of the bottom surface curves from a substantially vertical orientation to a substantially horizontal orientation and then down to a substantially vertical orientation.

72. The cable exit trough of claim 2, wherein the curved portion of the bottom surface leads upwardly after extending over the upstanding side of the lateral trough section.

73. The cable routing system of claim 36, wherein the two side walls are positioned on opposite sides of the exit surface, the exit surface and the two side walls being sufficiently curved to maintain a cable minimum bend radius for cables entering the exit trough from opposite ends of the lateral trough section.

74. The cable routing system of claim 36, wherein the exit surface curves from a substantially vertical orientation to at least a substantially horizontal orientation.

75. The cable routing system of claim 74, wherein the exit surface curves from a substantially vertical orientation to a substantially horizontal orientation and then down to a substantially vertical orientation.

76. The cable routing system of claim 54, wherein the curved portion of the bottom surface curves from a substantially vertical orientation to at least a substantially horizontal orientation.

77. The cable routing system of claim 76, wherein the curved portion of the bottom surface curves from a substantially vertical orientation to a substantially horizontal orientation and then down to a substantially vertical orientation.

78. The cable routing system of claim 54, wherein the curved portion of the bottom surface leads upwardly after extending over the upstanding side of the lateral trough section.

\* \* \* \* \*